(12) United States Patent
Ando et al.

(10) Patent No.: US 8,654,797 B2
(45) Date of Patent: Feb. 18, 2014

(54) DATA RELAY DEVICE AND DATA RELAY METHOD USED IN THE DEVICE

(75) Inventors: Hiroya Ando, Toyota (JP); Osamu Hirashima, Toyota (JP); Yusuke Satoh, Toyota (JP); Katsutomo Sasakura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 286 days.

(21) Appl. No.: 13/130,987

(22) PCT Filed: Apr. 8, 2009

(86) PCT No.: PCT/JP2009/001635
§ 371 (c)(1),
(2), (4) Date: May 24, 2011

(87) PCT Pub. No.: WO2010/116416
PCT Pub. Date: Oct. 14, 2010

(65) Prior Publication Data
US 2011/0235648 A1 Sep. 29, 2011

(51) Int. Cl.
*H04J 3/06* (2006.01)
(52) U.S. Cl.
USPC ............................. 370/503; 370/401; 710/110
(58) Field of Classification Search
None
See application file for complete search history.

(56) References Cited

U.S. PATENT DOCUMENTS

| | | | | |
|---|---|---|---|---|
| 7,623,552 B2* | 11/2009 | Jordan et al. | .................. | 370/503 |
| 7,751,447 B2* | 7/2010 | Heinle et al. | .................. | 370/503 |
| 7,801,162 B2* | 9/2010 | Jeon et al. | .................. | 370/402 |
| 7,801,173 B2* | 9/2010 | Takatori et al. | .................. | 370/466 |
| 7,826,479 B2* | 11/2010 | Fujimori | .................. | 370/466 |
| 7,848,361 B2* | 12/2010 | Ungermann et al. | .................. | 370/507 |
| 8,037,226 B2* | 10/2011 | Fredriksson | .................. | 710/117 |
| 8,095,161 B2* | 1/2012 | Sandberg | .................. | 455/502 |
| 8,130,014 B2* | 3/2012 | Bogenberger et al. | .................. | 327/144 |
| 8,204,035 B2* | 6/2012 | Rausch et al. | .................. | 370/350 |
| 8,321,612 B2* | 11/2012 | Hartwich et al. | .................. | 710/110 |
| 8,331,390 B2* | 12/2012 | Rohatschek | .................. | 370/419 |
| 2006/0262814 A1* | 11/2006 | Ungermann et al. | .................. | 370/503 |
| 2007/0081548 A1* | 4/2007 | Jiang | .................. | 370/442 |

(Continued)

FOREIGN PATENT DOCUMENTS

| | | | |
|---|---|---|---|
| JP | 2007-174053 A | 7/2007 | |
| JP | 2008-219555 A | 9/2008 | |

(Continued)

OTHER PUBLICATIONS

International Search Report dated Jun. 23, 2009 of PCT/JP2009/001635.

*Primary Examiner* — Michael J Moore, Jr.
(74) *Attorney, Agent, or Firm* — Kenyon & Kenyon LLP

(57) ABSTRACT

To provide a data relay device which prevents a significant delay even when pieces of data are transmitted/received in protocols that are different from each other. Transmission timings at which pieces of data are transmitted/received in a network using an event trigger type communication protocol are estimated. Stay periods which occur when pieces of data are relayed and transmitted at predetermined transmission timings in a network using a time trigger type communication protocol are calculated while changing a reference time for the time trigger type communication protocol. Then, synchronization processing is performed in the network using the time trigger type communication protocol such that communication is performed using a reference time having a small stay period that has been calculated.

10 Claims, 16 Drawing Sheets

(56) References Cited

U.S. PATENT DOCUMENTS

2010/0054282 A1* 3/2010 Schirmer et al. .............. 370/503
2010/0281010 A1* 11/2010 Yamamoto .................... 707/705
2010/0332072 A1* 12/2010 Ishiko et al. ..................... 701/30

FOREIGN PATENT DOCUMENTS

| JP | 2008-277873 A | 11/2008 |
|---|---|---|
| JP | 2008-306648 A | 12/2008 |
| JP | 2009-027358 A | 2/2009 |

* cited by examiner

FIG. 5
| TYPE | FIRST COMMUNICATION NODE | CANID | INFORMATION CATEGORY (MESSAGE CATEGORY) | TRANSMISSION CYCLE | TRANSMISSION START INTERVAL |
|---|---|---|---|---|---|
| A | 10a | 1 | D1 | TD1 | 0 |
| B | 10a | 2 | D2 | TD2 | SD1 |
| C | 10a | 3 | D3 | TD3 | SD2 |
| D | 10b | 4 | D4 | TD4 | 0 |
| E | 10b | 5 | D5 | TD2 | SD3 |
| F | 10c | 6 | D6 | TD6 | 0 |
| G | 10d | 7 | D7 | TD7 | 0 |
| H | 10d | 8 | D8 | TD8 | SD4 |
| I | 10d | 9 | D9 | TD9 | SD5 |
FIG. 6
| FlexrayID |
|---|
| 1(30a) |
| 3(30c) |
FIG. 7
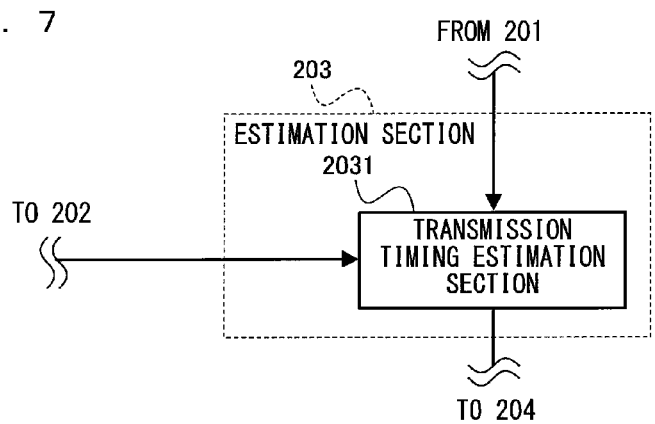
FIG. 8
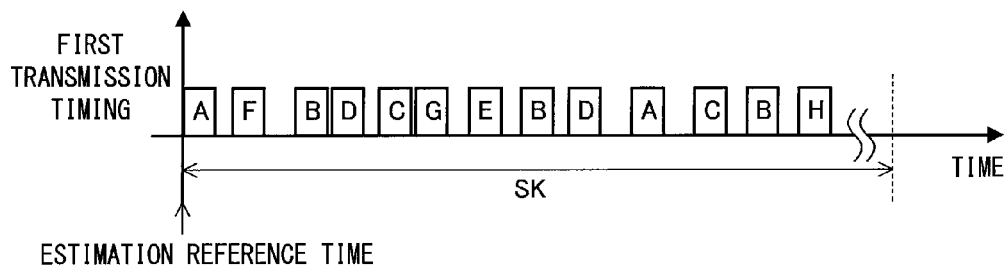

| TYPE | FIRST COMMUNICATION NODE | CANID | INFORMATION CATEGORY (MESSAGE CATEGORY) | TRANSMISSION CYCLE |
|---|---|---|---|---|
| A | 10a | 1 | D1 | TD1 |
| B | 10a | 2 | D2 | TD2 |
| C | 10a | 3 | D3 | TD3 |
| D | 10b | 4 | D4 | TD4 |
| E | 10b | 5 | D5 | TD2 |
| F | 10c | 6 | D6 | TD6 |
| G | 10d | 7 | D7 | TD7 |
| H | 10d | 8 | D8 | TD8 |
| I | 10d | 9 | D9 | TD9 |

| TYPE | FIRST COMMUNICATION NODE | CANID | INFORMATION CATEGORY (MESSAGE CATEGORY) |
|---|---|---|---|
| A | 10a | 1 | D1 |
| B | 10a | 2 | D2 |
| C | 10a | 3 | D3 |
| D | 10b | 4 | D4 |
| E | 10b | 5 | D5 |
| F | 10c | 6 | D6 |
| G | 10d | 7 | D7 |
| H | 10d | 8 | D8 |
| I | 10d | 9 | D9 |

| TYPE |
|------|
| B |
| E |
| F |
| H |

US 8,654,797 B2

DATA RELAY DEVICE AND DATA RELAY METHOD USED IN THE DEVICE

This is a 371 national phase application of PCT/JP2009/001635 filed 8 Apr. 2009, the contents of which are incorporated herein by reference.

TECHNICAL FIELD

The present invention relates to a data relay device, and in particular, to a data relay device which relays pieces of data transmitted/received in communication protocols which are different from each other.

BACKGROUND ART

In recent years, data relay devices have been developed which efficiently relay pieces of communication information, as data, transmitted/received in communication protocols which are different from each other. An example of such data relay devices includes, for example, a communication message conversion device disclosed in Patent Literature 1 (hereinafter, referred to as conventional art).

The conventional art efficiently relays data transmitted/received through one communication line in accordance with a CAN (Controller Area Network) protocol, and data transmitted/received through the other communication line in accordance with the FlexRay (registered trademark) protocol, from the one communication line to the other communication line, and vice versa. In the conventional art, the hardware is configured such that data can be relayed efficiently, and the number of relays of data which is less important is reduced or the like. Further, in order to efficiently relay a frame received from the other communication line in accordance with FlexRay protocol to the one communication line in accordance with the CAN protocol, the conventional art transmits/receives such a frame received in accordance with the FlexRay protocol in a format which can be easily divided.

[PATENT LITERATURE 1] Japanese Patent Laid-open Publication No. 2007-174053

DISCLOSURE OF THE INVENTION

Problems to be Solved by the Invention

However, the conventional art has a problem described below. Specifically, the conventional art relays data transmitted/received through one communication line in accordance with the CAN protocol and data transmitted/received through the other communication line in accordance with the FlexRay protocol, from the one communication line to the other communication line, and vice versa. Here, between the CAN protocol and the FlexRay protocol, the CAN protocol being an event trigger type protocol in which data is transmitted when it has become necessary for a transmission node to transmit the data to a communication line, the FlexRay protocol being a time trigger type protocol in which transmission timings are allotted in advance to transmission nodes in a communication line, data transmission/reception timings in accordance with the corresponding protocols are not synchronized. However, since the conventional art does not take it into consideration that such data transmission/reception timings in accordance with the corresponding protocols are not synchronized, there may be a case where a significant delay occurs when the conventional art relays data from one communication line to the other communication line.

Therefore, an object of the present invention is to provide a data relay device which does not cause a significant delay even when relaying pieces of data which are transmitted/received in accordance with protocols which are different from each other.

Solution to the Problems

In order to attain the object mentioned above, the present invention has the following features. A first aspect of the present invention is directed to a data relay device connected to a first communication line through which first data is transmitted/received in accordance with an event trigger type communication protocol and to a second communication line through which second data is transmitted/received in accordance with a time trigger type communication protocol, the data relay device comprising: an estimation section which estimates, with reference to a timing at which the first data transmitted from at least one first communication node connected to the first communication line is received, first transmission timings of all the first data transmitted/received through the first communication line; a schedule storage section which stores a predetermined schedule in accordance with which the second data is transmitted/received in accordance with the time trigger type communication protocol; a determination section which determines a reference timing for the schedule, by calculating stay periods which occur when data is relayed to one of the first communication line and the second communication line, based on the first transmission timings estimated by the estimation section and on the schedule stored in the schedule storage section; and a synchronization processing section which performs synchronization processing with at least one second communication node connected to the second communication line such that the second data is transmitted/received in accordance with the schedule with reference to the reference timing determined by the determination section.

In a second aspect of the present invention based on the first aspect, each of the at least one first communication node transmits one or more types of the first data in respective one or more transmission cycles which are predetermined, the one or more types being different from each other, the estimation section includes: a first-time reception timing recognition section which recognizes, for the one or more types, a timing at which a piece of the first data of the type is received for the first time, as a first-time reception timing; a cycle recognition section which recognizes, for the one or more types, when consecutive two pieces of the first data of the type are received, a time interval between the two pieces of the first data, as a transmission cycle; and a transmission timing estimation section which associates, for the one or more types, the first-time reception timing with the transmission cycle and estimates, for the one or more types, with reference to the first-time reception timing of the type, all timings arriving in the corresponding transmission cycle associated with the first-time reception timing of the type, as the first transmission timings.

In a third aspect of the present invention based on the first aspect, each of the at least one first communication node transmits one or more types of the first data in respective one or more transmission cycles which are predetermined to the respective one or more types, the one or more types being different from each other, the data relay device further includes: a cycle storage section which stores in advance the one or more transmission cycles in association with the one or more types, respectively, and the estimation section includes: a first-time reception timing recognition section which recognizes, for the one or more types, a timing at which a piece of the first data of the type is received for the first time, as a first-time reception timing; and a transmission timing estimation section which associates, for the one or more types, the first-time reception timing with a corresponding transmission cycle and estimates, for the one or more types, with reference to the first-time reception timing of the type, all timings arriving in the corresponding transmission cycle associated with the first-time reception timing of the type, as the first transmission timings.

In a fourth aspect of the present invention based on the first aspect, each of the at least one first communication node transmits one or more types of the first data which are different from each other, in respective one or more transmission cycles which are predetermined to the respective one or more types, with reference to a timing at which a type of the first data that is predetermined to be firstly transmitted is transmitted and after respective one or more transmission start intervals predetermined to the respective one or more types have elapsed, the data relay device further includes: a cycle storage section which stores in advance the one or more transmission cycles in association with the one or more types respectively; and a transmission start interval storage section which stores the one or more transmission start intervals predetermined to the respective one or more types for each of the at least one first communication node, the estimation section includes: a transmission timing estimation section which estimates, with reference to a time when a piece of the first data is received for the first time from each of the at least one first node, all timings, for the one or more types, that will arrive in a corresponding transmission cycle predetermined to the type after a corresponding transmission start interval predetermined to the type elapses, as the first transmission timings.

In a fifth aspect of the present invention based on the first aspect, the determination section includes: a setting section which assumes and sets timings arriving at a predetermined time interval, as assumed timings; a relay timing estimation section which estimates, for each of the assumed timings set by the setting section, when synchronization processing has been performed with the at least one second communication node such that the second data is transmitted/received in accordance with the schedule with reference to the corresponding assumed timing, relay timings at each of which the second data is received from the second communication line and relayed and transmitted as the first data to the first communication line; a calculation section which calculates, for each of the assumed timings used by the relay timing estimation section in estimating the relay timings, overlapping periods which are caused by the first transmission timings estimated by the estimation section overlapping the relay timings estimated by the relay timing estimation section, as the stay periods; a sum calculation section which calculates a sum of the overlapping periods calculated by the calculation section for each of the assumed timings; and a reference timing determination section which determines an assumed timing, as the reference timing, that has the smallest sum of the overlapping periods among the sums of the overlapping periods, the sums calculated by the sum calculation section for the respective assumed timings.

In a sixth aspect of the present invention based on the first aspect, the determination section includes: a setting section which assumes and sets timings arriving at a predetermined time interval, as assumed timings; a relay timing estimation section which estimates, for each of the assumed timings set by the setting section, when synchronization processing has been performed with the at least one second communication node such that the second data is transmitted/received in accordance with the schedule with reference to the corresponding assumed timing, relay timings at each of which the second data is received from the second communication line and relayed and transmitted as the first data to the first communication line; a calculation section which calculates, for each of the assumed timings used by the relay timing estimation section in estimating the relay timings, overlapping periods which are caused by the first transmission timings estimated by the estimation section overlapping the relay timings estimated by the relay timing estimation section, as the stay periods; a standard deviation calculation section which calculates a standard deviation of the overlapping periods calculated by the calculation section for each of the assumed timings; and a reference timing determination section which determines an assumed timing, as the reference timing, that has the smallest standard deviation of the overlapping periods among the standard deviations of the overlapping periods, the standard deviations calculated by the standard deviation calculation section for the respective assumed timings.

In a seventh aspect of the present invention based on the first aspect, the determination section includes: a setting section which assumes and sets timings arriving at a predetermined time interval, as assumed timings; a transmission timing estimation section which estimates, for each of the assumed timings set by the setting section, when synchronization processing has been performed with the at least one second communication node such that the second data is transmitted/received in accordance with the schedule with reference to the corresponding assumed timing, second transmission timings at each of which the second data is transmitted to the second communication line, based on the schedule; a calculation section which calculates, for each of the assumed timings used by the transmission timing estimation section in estimating the second transmission timings, delay periods as the stay periods, in which delay periods pieces of the first data which have been received at the first transmission timings estimated by the estimation section are relayed and transmitted to the second communication line as pieces of the second data at the second transmission timings estimated by the transmission timing estimation section; a sum calculation section which calculates a sum of the delay periods calculated by the calculation section for each of the assumed timings; and a reference timing determination section which determines an assumed timing, as the reference timing, that has the smallest sum of the delay periods among the sums of the delay periods, the sums calculated by the sum calculation section for the respective assumed timings.

In an eighth aspect of the present invention based on the first aspect, the determination section includes: a setting section which assumes and sets timings arriving at a predetermined time interval, as assumed timings; a transmission timing estimation section which estimates, for each of the assumed timings set by the setting section, when synchronization processing has been performed with the at least one second communication node such that the second data is transmitted/received in accordance with the schedule with reference to the corresponding assumed timing, second transmission timings at each of which the second data is transmitted to the second communication line, based on the schedule; a calculation section which calculates, for each of the assumed timings used by the transmission timing estimation section in estimating the second transmission timings, delay periods as the stay periods, in which delay periods pieces of the first data which have been received at the first transmission timings estimated by the estimation section are relayed and transmitted to the second communication line as pieces of the second data at the second transmission timings estimated by the transmission timing estimation section; a standard deviation calculation section which calculates a standard deviation of the delay periods calculated by the calculation section for each of the assumed timings; and a reference timing determination section which determines an assumed timing, as the reference timing, that has the smallest standard deviation of the delay periods among the standard deviations of the delay periods, the standard deviations calculated by the standard deviation calculation section for the respective assumed timings.

In a ninth aspect of the present invention based on any one of the fifth aspect to the eighth aspect, the setting section sets the assumed timings only within a predetermined time period from a time used as a reference by the estimation section when performing estimation.

A tenth aspect of the present invention is directed to a data relay method used in a data relay device connected to a first communication line through which first data is transmitted/received in accordance with an event trigger type communication protocol and to a second communication line through which second data is transmitted/received in accordance with a time trigger type communication protocol, the method comprising: an estimation step of estimating, with reference to a timing at which the first data transmitted from at least one first communication node connected to the first communication line is received, first transmission timings of all the first data transmitted/received through the first communication line; a determination step of determining, by calculating stay periods which occur when data is relayed to one of the first communication line and the second communication line, based on the first transmission timings estimated in the estimation step and based on a predetermined schedule in accordance with which the second data is transmitted/received in accordance with the time trigger type communication protocol, a reference timing for the schedule; and a synchronization processing step of performing synchronization processing with at least one second communication node connected to the second communication line such that the second data is transmitted/received in accordance with the schedule with reference to the reference timing determined by the determination step.

Advantageous Effects of the Invention

According to the first aspect of the present invention, based on the first data reception timings at which data is transmitted/received in accordance with an event trigger type communication protocol and based on the predetermined schedule in accordance with which second data is transmitted/received in the time trigger type communication protocol, stay periods are calculated which occur when data is relayed to a network in which data is transmitted/received in one of the communication protocols, whereby the reference timing is determined for the schedule. Therefore, a significant delay can be prevented even when pieces of data are relayed which are transmitted/received in communication protocols which are different from each other.

According to the second aspect of the present invention, it is possible to estimate timings at which the first communication nodes transmit pieces of the first data to the first communication line, based on a timing at which the first data is received from the first communication line.

According to third aspect of the present invention, it is possible to recognize timings at which the first communication nodes transmit pieces of the first data to the first communication line, even if a timing at which each of the first communication nodes transmits a piece of the first data for the first time to the first communication line is not stored in advance.

According to the fourth aspect of the present invention, it is possible to recognize the timings at which the first communication nodes transmit pieces of first data to the first communication line, merely by receiving a piece of first data transmitted for the first time from each of the first communication nodes connected to the first communication line.

According to each of the fifth and sixth aspects of the present invention, it is possible to prevent a significant delay from occurring when data is relayed from a network using a time trigger type communication protocol to a network using an event trigger type communication protocol.

According to each of the seventh and eighth aspects of the present invention, it is possible to prevent a significant delay from occurring when data is relayed from a network using an event trigger type communication protocol to a network using a time trigger type communication protocol.

According to the ninth aspect of the present invention, it is possible to reduce the processing loads when a reference timing is determined.

According to the data relay method according to the present invention, it is possible to acquire a similar effect to that by the above described data relay system.

BRIEF DESCRIPTION OF THE DRAWINGS

FIG. 5 shows an example of first data information in the first embodiment.

FIG. 6 shows an example of relay data information in the first embodiment.

FIG. 7 is a function block diagram showing further in detail a functional configuration of an estimation section according to the first embodiment.

FIG. 8 shows an example of a result of an estimation of data transmission timings in a first network.

DESCRIPTION OF THE REFERENCE CHARACTERS

| | |
|---|---|
| 1 | network |
| 10a to 10d | first communication node |
| 20, 21, 22, 23, 24 | data relay device |
| 30a to 30d | second communication node |
| 201 | reception section |
| 202, 206, 208, 210, 212 | storage section |
| 203, 207, 209 | estimation section |
| 204, 211, 213 | determination section |
| 205 | relay section |

BEST MODE FOR CARRYING OUT THE INVENTION

First Embodiment

Figure 1:
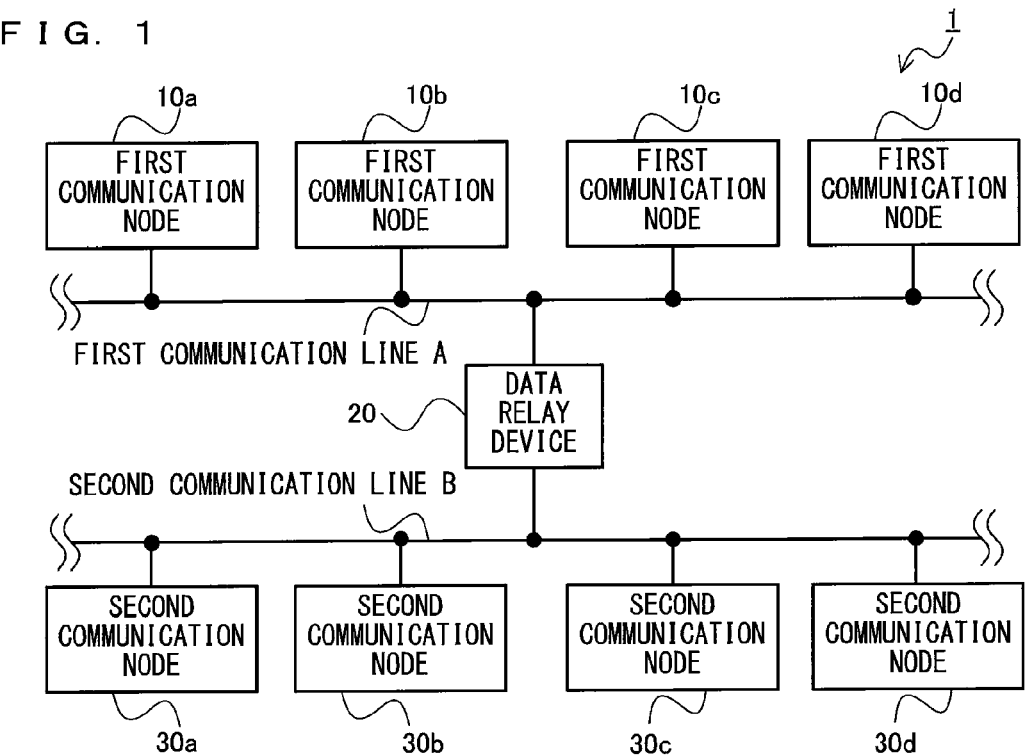
FIG. 1 shows an example of a configuration of a network in the present invention.

FIG. 1 is a block diagram showing a schematic structure of a network 1 in which a data relay device 20 according to the present embodiment relays data. The network 1 includes a first network in which first communication nodes 10a to 10d and the data relay device 20 are each connected to a first communication line A, and a second network in which second communication nodes 30a to 30d and the data relay device 20 are each connected to a second communication line B. The data relay device 20 according to the present embodiment is connected each of the first communication line A and the second communication line B, and relays data between the first network and the second network.

In the first network, each of the first communication nodes 10a to 10d and the data relay device 20 transmits/receives first data in accordance with an event trigger type communication protocol which allows each of the first communication nodes 10a to 10d and the data relay device 20 to transmit/receive data at a timing when it has become necessary for them to transmit the data. On the other hand, in the second network, each of the second communication nodes 30a to 30d and the data relay device 20 transmits/receives second data in accordance with a time trigger type communication protocol which allows each of the second communication nodes 30a to 30d and the data relay device 20 to transmit/receive data which has become necessary to be transmitted in accordance with a predetermined schedule. In the present embodiment, a CAN (Controller Area Network) protocol is used as an example of the event trigger type communication protocol, and a FlexRay (registered trademark) protocol is used as an example of the time trigger type communication protocol.

The first communication nodes 10a to 10d transmit/receive frames as the first data to/from each other, the frames being in a format defined by the protocol used in the first network (CAN protocol in the present embodiment). Moreover, each of the first communication nodes 10a to 10d receives pieces of data addressed to itself among pieces of data relayed by the data relay device 20.

Each of the first communication nodes 10a to 10d according to the present embodiment transmits one or more types of first data. Moreover, the first communication nodes 10a to 10d transmits, to each other, different types of first data. Here, the type of the first data is a type classified by an identifier (CAN-ID in the present embodiment) of a frame transmitted as the first data. In the present embodiment, each of the first communication nodes 10a to 10d is provided in advance with one or more CAN-IDs as the identifier(s), which are different from each other. Moreover, in the present embodiment, with respect to each of the first communication nodes 10a to 10d, an information category, which is contained in a frame to be transmitted as the first data, is predetermined in association with a corresponding CAN-ID. Then, in the present embodiment, each of the first communication nodes 10a to 10d transmits a frame, as the first data, which contains one of the CAN-ID(s) allotted in advance to the first communication node and one piece of information of the category corresponding to the CAN-ID.

Each of the first communication nodes 10a to 10d according to the present embodiment starts operation when the power supply is on, and starts, upon completion of preparatory processing for starting processing of generating first data and the like, transmission of the first data. With respect to each of the first communication nodes 10a to 10d according to the present embodiment, a type of the first data, which is firstly transmitted when transmission of the first data is started, is predetermined as first-time transmission data. Further, with respect to each of the first communication nodes 10a to 10d according to the present embodiment, a transmission start interval, which is a time period from an initial transmission timing of the first-time transmission data until a start of transmission of another type of first data, and a transmission cycle, in which the transmission is performed repeatedly after the transmission is started, are predetermined in association with a corresponding type of the first data.

In the description of the present invention, as shown in FIG. 5 which is referred to in the description below, the CAN-IDs 1 to 9 are associated with the types A to I, respectively, of the first data.

Figure 2:
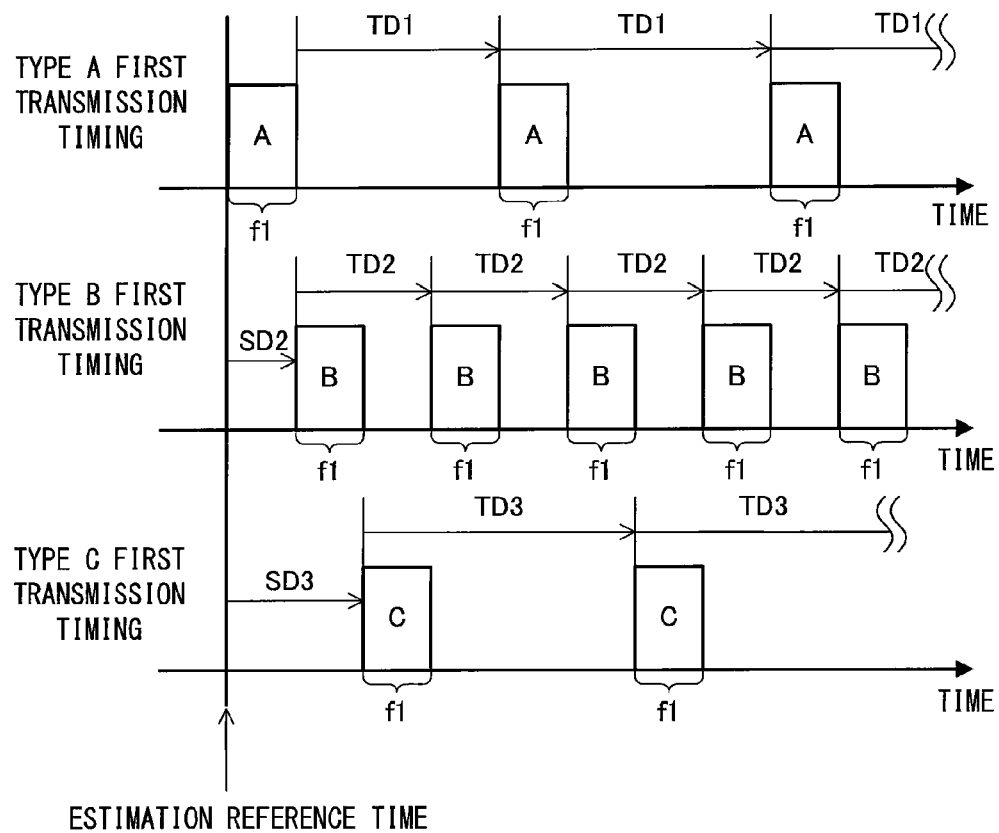
FIG. 2 shows an example of data transmission timings of a first communication node.

FIG. 2 shows, for example, transmission start intervals SD1 to SD2 and transmission cycles TD1 to TD3, which are predetermined to the first communication node 10a. As shown in FIG. 2, the first communication node 10a is predetermined to operate such that it starts transmission of type A first data (hereinafter referred to as first data A) which is predetermined as the first-time transmission data and then transmits the first data A in the transmission cycle TD1. Further, as shown in FIG. 2, the first communication node 10a is predetermined to operate such that after it started transmission of the first data A and when the transmission start interval SD1 has elapsed, it transmits type B first data (hereinafter referred to as first data B) in the transmission cycle TD2 in parallel with the transmission of the first data A. Further, as shown in FIG. 2, the first communication node 10a is predetermined to operate such that after it started transmission of the first data A and when the transmission start interval SD2 has elapsed, it transmits type C first data (hereinafter referred to as first data C) in the transmission cycle TD3 in parallel with the transmission of the first data A and B.

As described above, the type of the first data to be transmitted as the first-time transmission data and the transmission cycle of the first-time transmission data are predetermined with respect to the first communication node 10a. Further, with respect to the first communication node 10a, a transmission start interval and a transmission cycle are predetermined to each of the types of the first data that are other than the first-time transmission data, in association with one another. The first communication node 10a transmits the first data at transmission timings which arrive cyclically, for each type, after the transmission start interval and thereafter in the transmission cycle (hereinafter referred to as first transmission timing). Similarly, with respect to each of the first communication nodes 10b to 10d, a type of the first data to be transmitted as the first-time transmission data and a transmission cycle of the first-time transmission data are predetermined, and further, a transmission start interval and a transmission cycle are predetermined to each of the types of the first data that are other than the first-time transmission data, in association with one another. Each of the first communication nodes 10b to 10d transmits the first data at a corresponding first transmission timing which cyclically arrives for each type, similarly to the first communication node 10a.

It should be noted that the transmission start intervals and the transmission cycles predetermined to the corresponding first communication nodes 10a to 10d may be the same with each other, or may be different from each other. Since the first communication nodes 10a to 10d do not synchronize in the first transmission timings with each other, there may be a case where the first transmission timings may overlap with each other. In such a case, arbitration processing described below is performed. As a result, the first transmission timings of all the types of the first data transmitted to the first communication line A by all the first communication nodes are arranged in a cyclic manner.

The data relay device 20 converts a piece of the first data of a type predetermined to be relayed to the second network (hereinafter referred to as CF relay data), among pieces of the first data transmitted by the first communication nodes 10a to 10d, into a frame of a format in accordance with the protocol used in the second network (FlexRay protocol in the present embodiment); and then, relays and transmits the converted frame from the first communication line A to the second communication line B as the second data. Further, the data relay device 20 converts a piece of the second data of a type predetermined to be relayed to the first network (hereinafter referred to as FC relay data), among pieces of the second data transmitted by the second communication nodes 30a to 30d, into a frame of a format in accordance with the protocol used in the first network (CAN protocol in the present embodiment); and then, relays and transmits the converted frame from the second communication line B to the first communication line A as the first data.

The second communication nodes 30a to 30d each transmit/receive to/from each other a frame, as the second data, of a format defined in the FlexRay protocol in accordance with a schedule predetermined based on the FlexRay protocol. Moreover, each of the second communication nodes 30a to 30d receives a piece of data addressed to itself, among pieces of data relayed as the second data by the data relay device 20. The outline of the FlexRay protocol will be described below.

Figure 3:
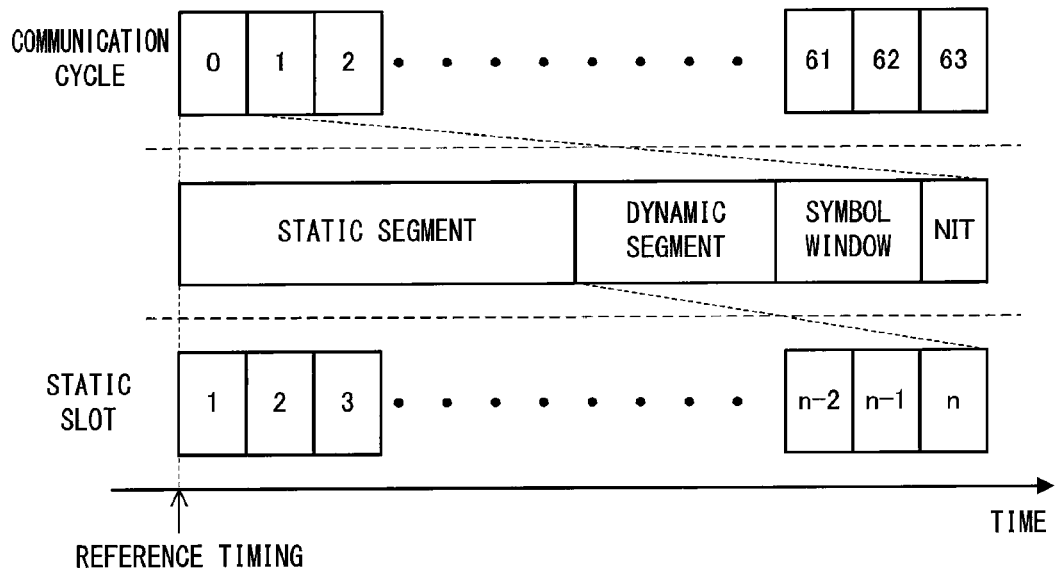
FIG. 3 illustrates a concept of a communication time period in a FlexRay protocol.

FIG. 3 illustrates a hierarchical classification of a communication time period according to the FlexRay protocol. Hereinafter, a manner of division of the communication time period according to the FlexRay protocol will be described. The communication time period according to the FlexRay protocol is divided into communication cycles to which the numbers from 0 to 63 are allotted respectively, as shown in FIG. 3. The data relay device 20 and the second communication nodes 30a to 30d forming the second network sequentially transmit, to the second communication line B, pieces of the second data in their corresponding allotted time periods in one communication cycle. Then, upon completion of the transmission/reception of the pieces of the second data in the one communication cycle, the data relay device 20 and the second communication nodes 30a to 30d forming the second network start transmission/reception of pieces of the second data in the next communication cycle. After completing the transmission/reception of pieces of the second data in the communication cycles 0 to 63, the data relay device 20 and the second communication nodes 30a to 30d repeat transmission/receipt of pieces of the second data, starting at the communication cycle 0, again.

As shown in FIG. 3, the time period of one communication cycle is divided into a static segment, a dynamic segment, a symbol window, and an NIT (Network Idle Time). Further, as shown in FIG. 3, the time period of the static segment is divided into time units, each time unit being a static slot whose number is incremented from 1 to n. In the FlexRay protocol, each static slot is allotted with a transmission time period of a frame having a FlexRay-ID having the same number as that of the static slot. All of the communication nodes and the data relay device forming the second network (the data relay device 20 and the second communication nodes 30a to 30d in the present embodiment) are allotted in advance with different FlexRay-IDs, respectively, and transmit frames having the respective allotted FlexRay-IDs, as the second data. It should be noted that, in the present embodiment, the type of the second data transmitted to the second communication line B is classified by the FlexRay-ID.

Each of the data relay device 20 and the second communication nodes 30a to 30d forming the second network performs synchronization processing, by using the start timing of the communication cycle 0 as a reference timing KJT, in which processing the amount of elapsed time is recognized with reference to the reference timing KJT. After performing the synchronization processing, each of the data relay device 20 and the second communication nodes 30a to 30d forming the second network independently recognizes the number of the static slot which is incremented in accordance with the amount of time elapsed from the reference timing KJT, by counting the time with a timer built in itself. Each of the data relay device 20 and the second communication nodes 30a to 30d forming the second network transmits a frame to be transmitted when it has determined, based on the independently recognized time, that a time period corresponding to a static slot having the same number as that of the FlexRay-ID of the frame had arrived. Thereby, the data relay device 20 and the second communication nodes 30a to 30d can transmit frames without causing them to collide with each other.

In the FlexRay protocol, the data relay device 20 and the second communication nodes 30a to 30d forming the second network are allotted with FlexRay-IDs having the same numbers as those of the static slots, respectively, the static slots having different numbers, respectively. Accordingly, the timings at which the data relay device 20 and the second communication nodes 30a to 30d transmit pieces of the second data, respectively, can be predetermined as a schedule which is defined with reference to the reference timing KJT. When transmitting/receiving pieces of the second data in accordance with the FlexRay protocol, the data relay device 20 and the second communication nodes 30a to 30d according to the present embodiment sequentially transmit the pieces of the second data to the second communication line B in accordance with the schedule defined with reference to the reference timing KJT.

In FIG. 3, the dynamic segment which comes after the static segment is a period during which each of the data relay device 20 and the second communication nodes 30a to 30d forming the second network can transmit a frame at a timing as necessary. The symbol window which comes after the dynamic segment may not be necessarily provided. The NIT which comes after the symbol window is a period during which correction of the time, error, or the like of the common time independently recognized by the data relay device 20 and the second communication nodes 30a to 30d forming the second network as described above are performed.

This is the end of the description of the schematic structure of the network 1 according to the present embodiment. It should be noted that the schematic structure of the network 1 shown in FIG. 1 is an exemplary case in which four first communication nodes, that is, the first communication nodes 10a to 10d, are connected to the first communication line A. However, the number of the first communication nodes connected to the first communication line A may be three or less, or five or more. Moreover, the schematic structure of the network 1 shown in FIG. 1 is an exemplary case in which four second communication nodes, that is, the second communication nodes 30a to 30d, are connected to the second communication line B. However, the number of the second communication nodes connected to the second communication line B may be three or less, or five or more.

The network 1 configured as shown in FIG. 1 causes overlapping periods. An overlapping period is a period in which a relay timing, in which the data relay device 20 receives FC relay data and relays and transmits the received FC relay data to the first communication line A as the first data (hereinafter referred to as FC relay timing), overlaps a first transmission timing of one of the communication nodes connected to the first communication line A (the first communication nodes 10a to 10d in the present embodiment). The reason for this is that it is difficult to design a configuration in which first transmission timings for all the types of first data to be transmitted/received via the first network and transmission timings for all the types of second data to be transmitted/received via the second network (hereinafter referred to as second transmission timing) do not overlap with each other, in consideration of the time necessary for the relays performed by the data relay device 20.

In the CAN protocol used in the first network, it is defined that in a case where an overlapping period described above occurs, so-called arbitration processing is performed. In such arbitration processing, predetermined communication nodes or the data relay device that have relatively low priorities transmit data at timings at which predetermined communication nodes or the data relay device that have relatively high priorities do not transmit data. In this arbitration processing, the predetermined communication nodes or the data relay device that have relatively low priorities withhold transmission of data and wait until timings arrive at which the predetermined communication nodes or the data relay device that have relatively high priorities stop transmission of data. Accordingly, in a case where the data relay device 20 according to the present embodiment has a relatively low priority in the first network, there may be a case where a relay delay time period, during which the data relay device 20 receives FC relay data from the second communication line B and relays and transmits the received FC relay data to the first communication line A as the first data, is significantly prolonged due to the arbitration processing.

Here, the first transmission timings at which each of all of the first communication nodes connected to the first communication line A transmits the first data are defined by predetermining the transmission start interval(s) and the transmission cycle(s) to the first communication node, as described above. Meanwhile, the second transmission timings at which each of all the second communication nodes connected to the second communication line B transmits the second data are predetermined based on a schedule which is defined with reference to the reference timing KJT, as described above.

Therefore, in the network 1, if the reference timing KJT changes, the time until FC relay data is received by the data relay device 20 changes, and thus an FC relay timing in which the FC relay data is relayed and transmitted to the first communication line A as the first data also changes. Therefore, in the network 1, if the reference timing KJT changes, the length of the period in which the FC relay timing overlaps a first transmission timing, that is, the length of an overlapping period changes. If the length of the overlapping period changes, the length of a relay delay time period caused by the arbitration processing changes.

Therefore, the data relay device 20 according to the present embodiment determines the reference timing KJT for the second network based on first transmission timings of each type of all of the first data connected to the first communication line A so that the relay delay time period is not significantly prolonged, irrespective of the predetermined priorities.

Figure 4:
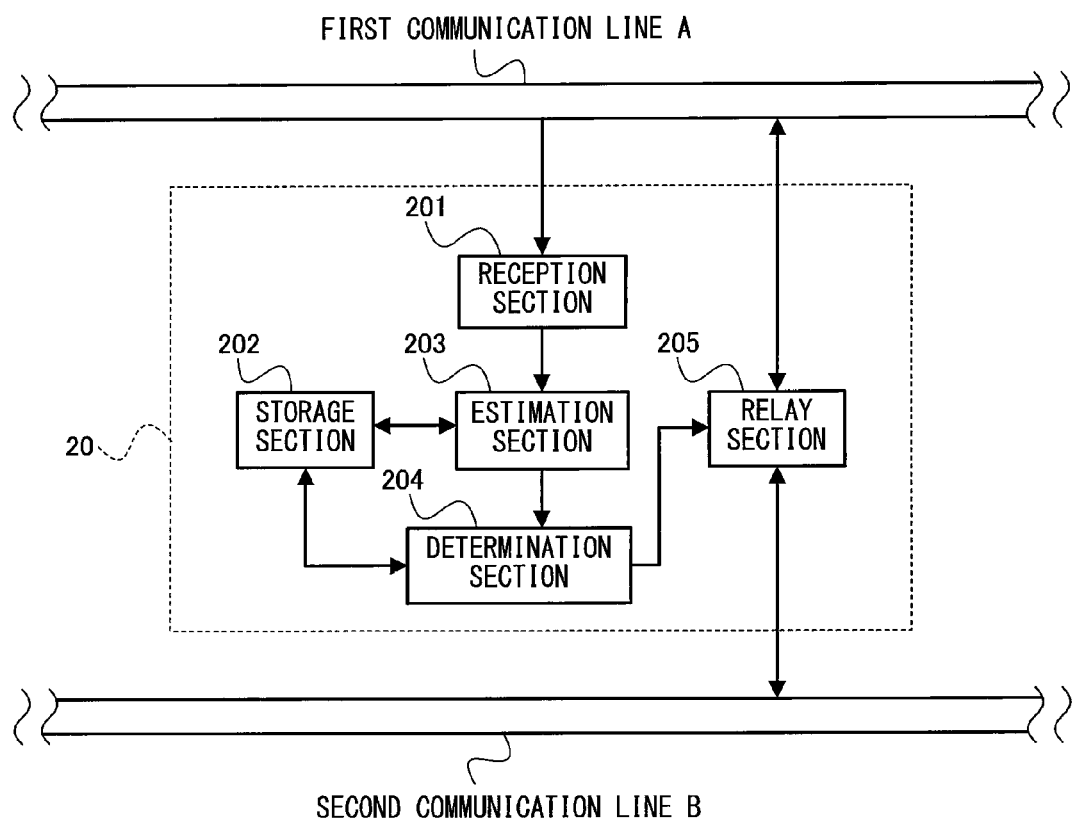
FIG. 4 is a function block diagram showing a functional configuration of a data relay device according to a first embodiment.

The data relay device 20 according to the present embodiment will be described further in detail. FIG. 4 is a function block diagram showing further in detail a functional configuration of the data relay device 20 according to the present embodiment. The data relay device 20 according to the present embodiment includes a reception section 201, a storage section 202, an estimation section 203, a determination section 204, and a relay section 205.

When pieces of first data are transmitted to the first communication line A by the first communication nodes 10a to 10d, the reception section 201 receives the transmitted pieces of first data. Upon receiving the pieces of first data from the first communication line A, the reception section 201 causes the estimation section 203 to acquire the received pieces of first data.

The storage section 202 stores first data information which indicates, with respect to all of the first communication nodes connected to the first communication line A, the CAN-IDs, information categories, and transmission start intervals and transmission cycles, in association with the corresponding types, the transmission start intervals and the transmission cycles being used when the corresponding first communication nodes transmit the first data as described above.

FIG. 5 shows a specific example of the first data information stored in the storage section 202. In the present embodiment, as shown in FIG. 5, the storage section 202 stores the first data information which associates, with types A to I, CAN-IDs 1 to 9, which are allotted in advance to the first communication nodes 10a to 10d, information categories (message category) D1 to D9, transmission cycles TD1 to TD9, and transmission start interval SD1 to SD5. In the present embodiment, in the first data information, the transmission start interval associated with the type of first data that is predetermined as the first-time transmission data and which is provided to each of the first communication nodes, is denoted by 0 as described above.

Further, the storage section 202 according to the present embodiment also stores a predetermined schedule as described above, and relay data information indicating the types of the second data to be relayed as the FC relay data among the types of the second data to be transmitted from the second communication nodes 30a to 30d to the second communication line B. FIG. 6 shows an example of the relay data information stored in the storage section 202. In the present embodiment, as shown as one example in FIG. 6, the storage section 202 stores relay data information which indicates FlexRay-IDs of the second data of to be relayed as FC relay data from the second communication line B to the first communication line A. Further, information stored in the storage section 202 according to the present embodiment includes information that the estimation section 203 and the determination section 204 cause the storage section 202 to store as described below.

The estimation section 203 estimates, based on the time points at which the reception section 201 has received pieces of first data transmitted from the first communication nodes connected to the first communication line A, first transmission timings for each type of first data to be transmitted/received through the first communication line A.

FIG. 7 is a block diagram showing further in detail a functional configuration of the estimation section 203 according to the present embodiment. The estimation section 203 according to the present embodiment includes a transmission timing estimation section 2031. Each time the transmission timing estimation section 2031 is caused to acquire pieces of first data by the reception section 201 after the data relay device 20 has started operation, the transmission timing estimation section 2031 associates the pieces of first data with the time points of the acquisition thereof as reception times, respectively, and then causes the storage section 202 to store the result. It should be noted that each reception time that is associated with a corresponding piece of first data by the transmission timing estimation section 2031 is counted by use of a timer not shown. Moreover, each time the transmission timing estimation section 2031 is caused to acquire pieces of first data by the reception section 201 after the data relay device 20 has started operation, the transmission timing estimation section 2031 determines whether all of the pieces of first-time transmission data from all of the first communication nodes connected to the first communication line A have been received.

More specifically, each time the transmission timing estimation section 2031 is caused to acquire pieces of first data by the reception section 201 after the data relay device 20 has started operation, associates the acquired pieces of first data with the reception times thereof, and then causes the storage section 202 to store the result, the transmission timing estimation section 2031 compares the first data information stored in the storage section 202 with the types of the pieces of first data which the transmission timing estimation section 2031 has acquired from the reception section 201 and caused the storage section 202 to store. By comparing the types of the pieces of first data stored in the storage section 202 with the first data information, the transmission timing estimation section 2031 determines whether all of the types of the pieces of first data associated with the transmission start interval 0 in the first data information are stored in the storage section 202. If the transmission timing estimation section 2031 has determined that all of the types of the pieces of first data associated with the transmission start interval 0 in the first data information are stored in the storage section 202, the transmission timing estimation section 2031 determines that all of the pieces of first-time transmission data from all the first communication nodes connected to the first communication line A have been received.

When the transmission timing estimation section 2031 has determined that all of the pieces of the first-time transmission data transmitted from all of the first communication nodes connected to the first communication line A have been received, the transmission timing estimation section 2031 estimates the first transmission timings described above with reference to the reception times of the pieces of the first-time transmission data stored in the storage section 202.

When estimating first transmission timings, the transmission timing estimation section 2031 firstly estimates first transmission timings for each type of all the first data transmitted by a first communication node that has transmitted a piece of the first-time transmission data that has the earliest reception time (hereinafter referred to as earliest first-time transmission data) (hereinafter referred to as earliest communication node). Hereinafter, a manner in which the transmission timing estimation section 2031 estimates first transmission timings for each type of all the first data transmitted by the earliest communication node will be described with reference to FIG. 2 again, on an assumption that the first communication node 10a is the earliest communication node.

When estimating first transmission timings for each type of all the first data transmitted by the earliest communication node, the transmission timing estimation section 2031 sets the reception time of the piece of first data of the type that has been received as the earliest first-time transmission data, as an estimation reference time as shown in FIG. 2. After setting the estimation reference time, the transmission timing estimation section 2031 estimates, with reference to the set estimation reference time, all timings (transmission timings f1 to f3 in the example shown in FIG. 2) for each of the types (A to C) of all the first data transmitted from the earliest communication node, said all timings arriving after the corresponding transmission start interval (0, SD1, and SD2) of the type associated with the corresponding CAN-ID (CAN-IDs 1 to 3) allotted to the earliest communication node in the first data information and then arriving in the corresponding transmission cycle (TD1 to TD3) associated with said corresponding transmission start interval in the first data information, as the first transmission timings of said type.

After estimating the first transmission timings for each type of all the first data transmitted by the earliest communication node, then the transmission timing estimation section 2031 estimates, with respect to a first communication node that has transmitted a piece of the first-time transmission data having the next earliest reception time, first transmission timings for each type of all the first data transmitted by this first communication node.

When estimating all the first transmission timings for the first communication node that has transmitted the piece of the first-time transmission data having the next earliest reception time, the transmission timing estimation section 2031 converts the reception time of this first-time transmission data into a time which is counted with reference to the above described estimation reference time. After converting the reception time of the next earliest first-time transmission data, the transmission timing estimation section 2031 estimates, with reference to the converted reception time, for each type of all the first data transmitted from this first communication node that has transmitted this piece of first-time transmission data, all timings that will arrive after the corresponding transmission start interval of the type associated with the corresponding CAN-ID allotted to this first communication node in the first data information, and then will arrive in the corresponding transmission cycle associated with said corresponding transmission start interval in the first data information, as the first transmission timings of said type.

Also when estimating all the first transmission timings for another first communication node that has transmitted a piece of the first-time transmission data having another reception time, the transmission timing estimation section 2031 converts the reception time of this first-time transmission data into a time which is counted with reference to the above described estimation reference time. After converting the reception time of this first-time transmission data into a time which is counted with reference to the estimation reference time, the transmission timing estimation section 2031 estimates, with reference to the converted time, for each type of all the first data transmitted from this first communication node that has transmitted this piece of first-time transmission data, all timings that will arrive after the corresponding transmission start interval of the type associated with the corresponding CAN-ID allotted to this first communication node in the first data information, and then will arrive in the corresponding transmission cycle associated with said corresponding transmission start interval in the first data information, as the first transmission timings of said type.

An example of a method for converting the reception time of the first-time transmission data into a time counted with reference to the estimation reference time includes a method in which the difference between the reception time and the estimation reference time is subtracted from the reception time.

With respect to the first communication node that has transmitted the earliest first-time transmission data through the first communication node that has transmitted the first-time transmission data having the latest reception time, the transmission timing estimation section 2031 estimates all the transmission timings for each type of first data transmitted from each of all of the first communication nodes. However, as shown as an example in FIG. 8, the transmission timing estimation section 2031 estimates all the first transmission timings which will arrive in a least common multiple period SK counted with reference to the estimation reference time. Here, the least common multiple period SK is a period equivalent to the least common multiple of the transmission cycles which are predetermined to the respective types of all the first data transmitted to the first communication line A.

The reason for this is as follows. Each type of first data transmitted to the first communication line A is cyclically transmitted after the transmission start interval and thereafter in the transmission cycle predetermined to the type as described above. Accordingly, if the transmission timing estimation section 2031 uses a period which is the least common multiple of the transmission cycles as a cycle, in which period the respective types of first data are transmitted cyclically and repeatedly at their corresponding first transmission timings, it is equivalent to that the transmission timing estimation section 2031 stores all the first transmission timings of each type of first data to be transmitted to the first communication line A in the entire operation period of the network 1.

It should be noted that in a case where the first transmission timings estimated for each type of first data overlap with each other, the transmission timing estimation section 2031 may estimate the first transmission timings further in consideration of the above described arbitration processing.

After estimating all the first transmission timings that will arrive in the least common multiple period SK with reference to the estimation reference time, the transmission timing estimation section 2031 causes the storage section 202 to store all the estimated first transmission timings.

The determination section 204 determines, based on the first transmission timings estimated by the transmission timing estimation section 2031 and the above described schedule stored in the storage section 202, a reference timing KJT used in the FlexRay protocol described above.

Figure 9:
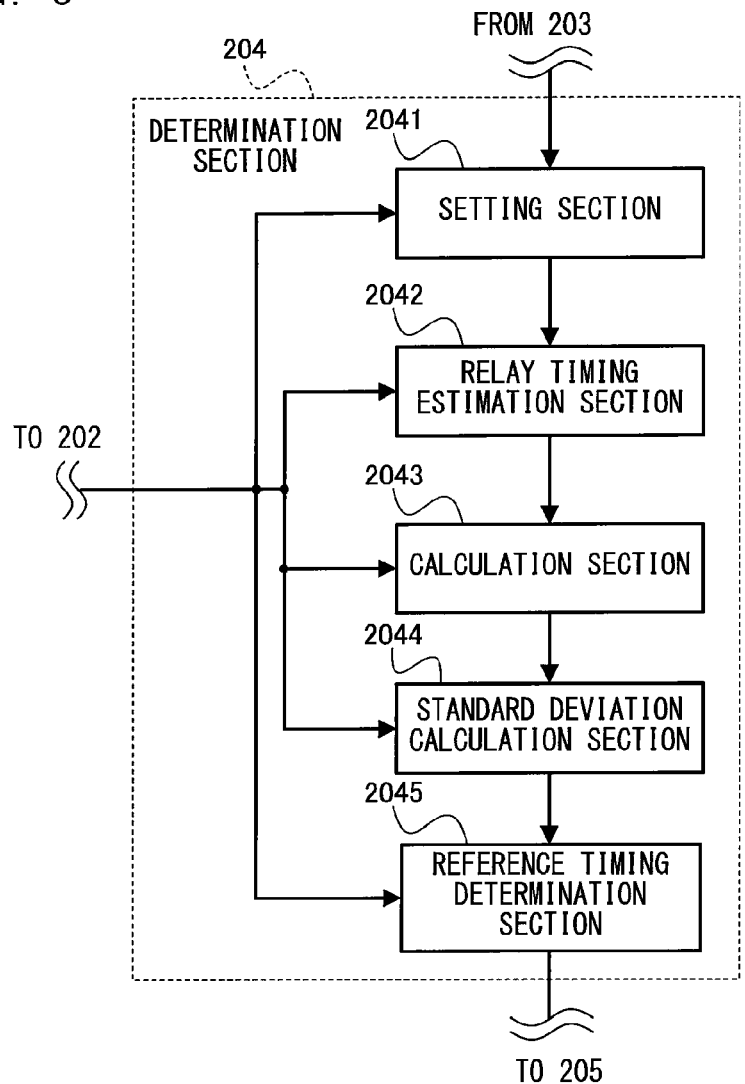
FIG. 9 is a function block diagram showing further in detail a functional configuration of a determination section 204 according to the first embodiment.

FIG. 9 is a function block diagram showing further in detail a functional configuration of the determination section 204 according to the present embodiment. The determination section 204 according to the present embodiment includes a setting section 2041, a relay timing estimation section 2042, a calculation section 2043, a standard deviation calculation section 2044, and a reference timing determination section 2045.

Figure 10:
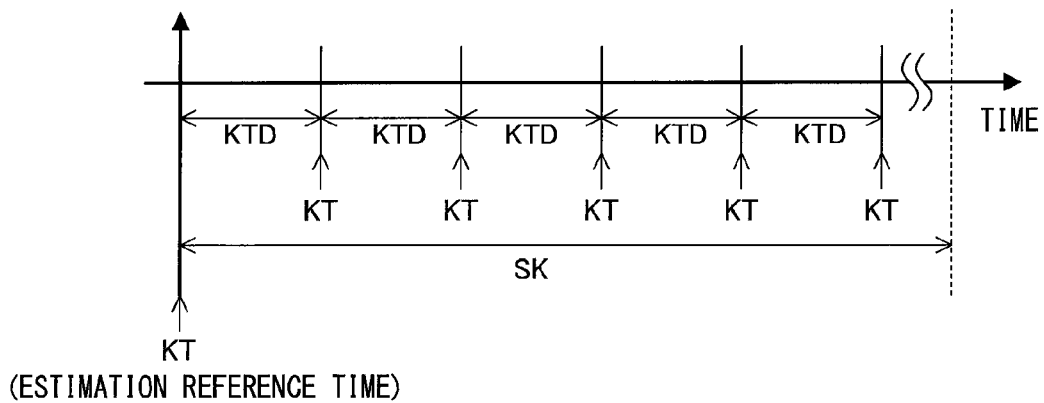
FIG. 10 shows an example of setting assumed timings.

After all the first transmission timings estimated by the transmission timing estimation section 2031 are stored in the storage section 202, the setting section 2041 assumes and sets assumed timings KT within the least common multiple period SK counted with reference to the estimation reference time as shown in an example in FIG. 10. When setting the assumed timings, as shown in an example in FIG. 10, the setting section 2041 may assume and set a timing that arrives in every KTD, which is a predetermined time interval, within the least common multiple period SK counted with reference to the estimation reference time, or may assume and set assumed timings KT at any desired timings. After setting the assumed timings KT, the setting section 2041 causes the storage section 202 to store all the set assumed timings KT.

After the storage section 202 has been caused to store all the assumed timings KT by the setting section 2041, the relay timing estimation section 2042 recognizes, among pieces of second data to be transmitted at respective second transmission timings by the second communication nodes connected to the second communication line B in accordance with the above described schedule stored in the storage section 202, FC transmission timings at which the FC relay data determined as described above are transmitted.

Figure 11:
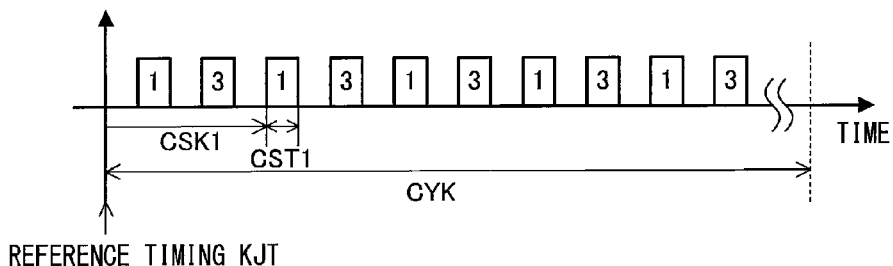
FIG. 11 shows an example of transmission timings of FC relay data in the first embodiment.

FIG. 11 shows FC transmission timings of FlexRay-ID 1 and 3 indicated by the relay data information shown as an example in FIG. 6. FIG. 11 shows an example of FC transmission timings which will arrive in accordance with the schedule in one communication cycle period (hereinafter referred to as cycle period CYK) counted with reference to the reference timing KJT as described above.

Figure 12:
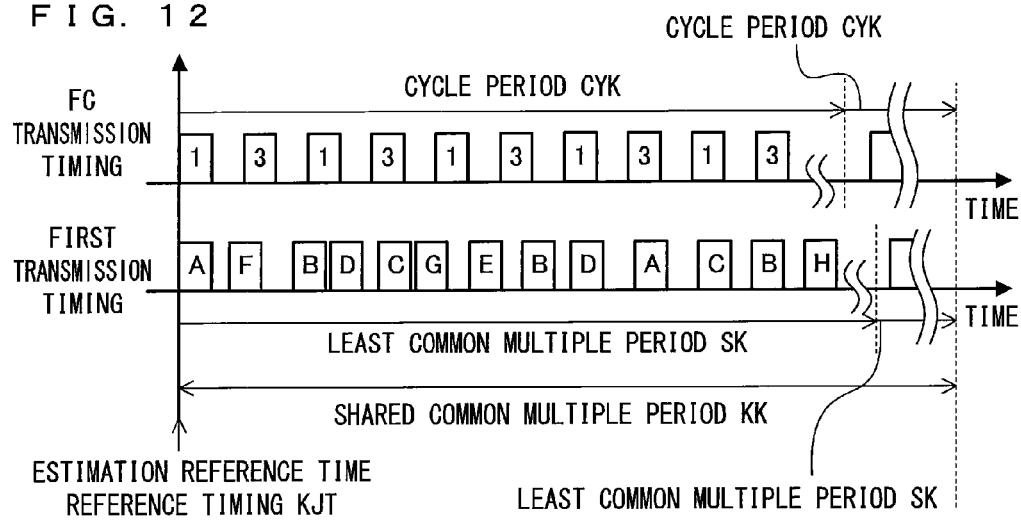
FIG. 12 shows an example of timings estimated by a relay timing estimation section according to the first embodiment.

After recognizing the FC transmission timings in a cycle period CYK counted with reference to the reference timing KJT, the relay timing estimation section 2042 estimates, as shown in an example in FIG. 12, timings at which the first transmission timings in least common multiple periods SK estimated by the transmission timing estimation section 2031 will arrive in a period equivalent to the least common multiple of the least common multiple period SK and the cycle period CYK (hereinafter referred to as shared common multiple period KK) and timings at which FC transmission timings recognized by the relay timing estimation section 2042 will arrive in a shared common multiple period KK. As shown in FIG. 12, the shared common multiple period KK is a period which is counted with reference to the estimation reference time and the reference timing KJT. The relay timing estimation section 2042 estimates all the first transmission timings that will arrive in a shared common multiple period KK counted with reference to the estimation reference time, and all the FC transmission timings that will arrive in a shared common multiple period KK counted with reference to the reference timing KJT, and then causes the storage section 202 to store the estimated timings of the respective types.

After the relay timing estimation section 2042 has caused the storage section 202 to store all the first transmission timings and the FC transmission timings that will arrive in the respective shared common multiple periods KK, the calculation section 2043 calculates overlapping periods between the first transmission timings that will arrive in the shared common multiple period KK counted with reference to the estimation reference time and the FC transmission timings that will arrive in the shared common multiple period KK counted with reference to the reference timing KJT, while shifting the reference timing KJT of the shared common multiple period KK counted with reference to the reference timing KJT to an assumed timing KT set by the setting section 2041.

Now, an overlapping period according to the present embodiment will be described. In the present embodiment, the period in which FC relay data is transmitted by a second communication node, the transmitted FC relay data is received by the data relay device 20, and the received FC relay data is relayed and transmitted as the first data to the first communication line A (hereinafter referred to as relay completion period) can be regard to be substantially zero. When the relay completion period is regarded to be substantially zero, an overlapping period of an FC transmission timing and a first transmission timing can be considered as a period in which in a case where a first communication node transmits a piece of first data and the data relay device 20 transmits a piece of first data in the first communication line A, the transmitted pieces of first data collide with each other.

Figure 13:
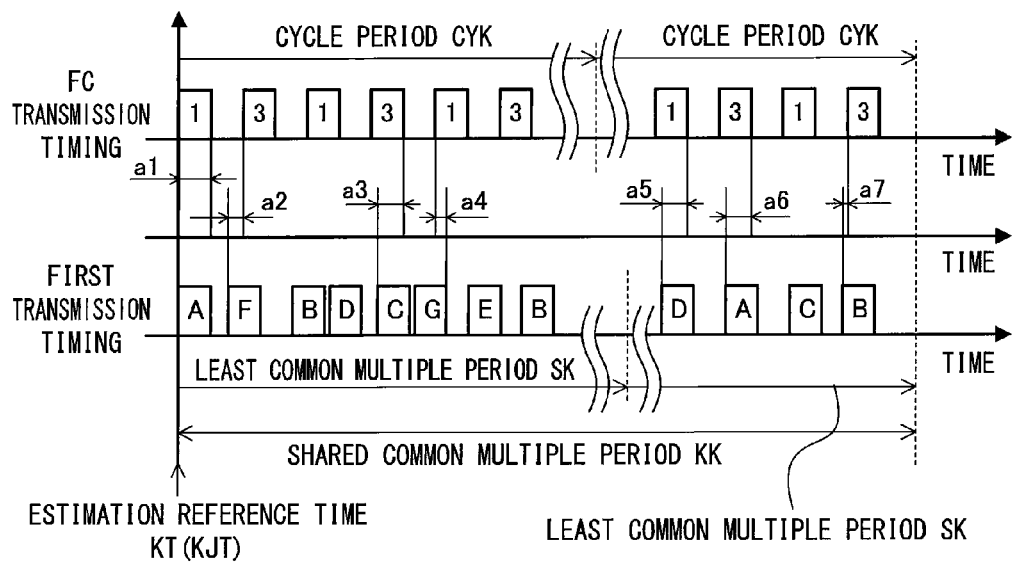
FIG. 13 shows an example of overlapping periods in the first embodiment.

FIG. 13 shows an example of overlapping periods calculated by the calculation section 2043. FIG. 13 shows, as an example of overlapping periods calculated by the calculation section 2043, overlapping periods of the first transmission timings that will arrive in a shared common multiple period KK counted with reference to the estimation reference time and the FC transmission timings counted with reference to the reference timing KJT which has been made to coincide with an assumed timing KT set at the estimation reference time.

As shown in the example in FIG. 13, the calculation section 2043 compares the first transmission timings with the FC transmission timings and thereby calculates the lengths of the respective overlapping periods in a shared common multiple period KK counted with reference to the reference timing KJT which has been made to coincide with the assumed timing KT. As an example of the lengths of the respective overlapping periods calculated by the calculation section 2043, FIG. 13 shows the calculated lengths a1 to a7 of the respective overlapping periods.

Figure 14:
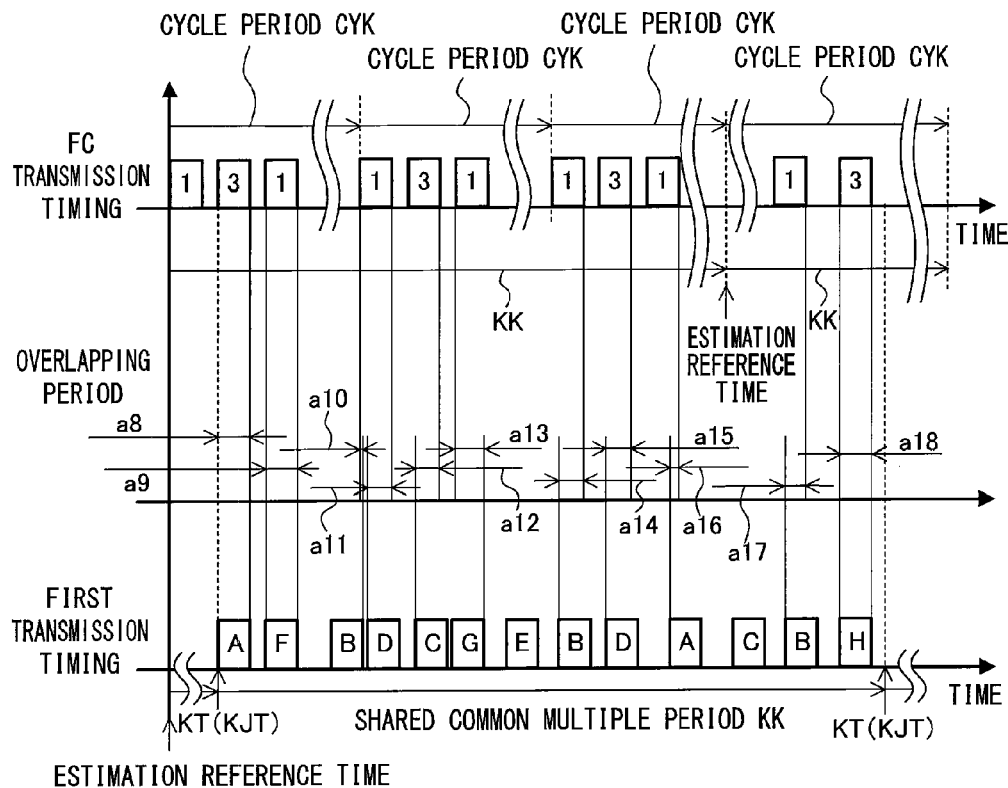
FIG. 14 shows another example of overlapping periods in the first embodiment.

FIG. 14 shows another example of the overlapping periods calculated by the calculation section 2043. As another example of the overlapping periods calculated by the calculation section 2043, FIG. 14 shows overlapping periods of the first transmission timings that will arrive in a shared common multiple period KK counted with reference to the estimation reference time and the FC transmission timings counted with reference to the reference timing KJT that has made to coincide with another assumed timing KT, which has been set by the setting section 2041 to a time different from the estimation reference time. As an example of the lengths of the respective overlapping periods calculated by the calculation section 2043, FIG. 14 shows the calculated lengths a8 to a18 of the respective overlapping periods.

As shown in each of FIG. 13 and FIG. 14, the calculation section 2043 calculates, for each of the above assumed timings KT, the lengths of the respective overlapping periods of the first transmission timings that will arrive in a shared common multiple period KK counted with reference to the estimation reference time and the FC transmission timings that will arrive in a shared common multiple period KK counted with reference to the reference timing KJT that has been made to coincide with an assumed timing KT set by the setting section 2041, and then causes the storage section 202 to store the calculated lengths of the respective overlapping periods of each of the above assumed timings KT in association with the corresponding assumed timing KT.

After the storage section 202 has stored the lengths of the respective overlapping periods calculated by the calculation section 2043 with respect to all of the assumed timings KT, the standard deviation calculation section 2044 calculates a standard deviation of the lengths of the respective overlapping periods stored in the storage section 202 for each assumed timing KT, and then causes the storage section 202 to store the calculated standard deviation of the lengths of the respective overlapping periods in association with a corresponding assumed timing KT.

The standard deviation calculation section 2044 calculates the standard deviation of the lengths of the respective overlapping periods for each assumed timing KT using the formula (1) below.

$$\sigma_b = \sum_{i=0}^{k} \sqrt{(am-ai)^2} \tag{1}$$

Here, "am" is an average value of the lengths of the respective overlapping periods associated with one assumed timing KT. The symbol "k" is the number of the detected overlapping periods.

The reference timing determination section 2045 identifies an assumed timing KT associated with the smallest standard deviation among the standard deviations of the lengths of the respective overlapping periods which the storage section 202 has been caused to store for each of all of the assumed timings KT by the standard deviation calculation section 2044. The reference timing determination section 2045 determines the identified assumed timing KT as the reference timing KJT to be used in performing synchronization processing, and causes the storage section 202 to store it.

Figure 15:
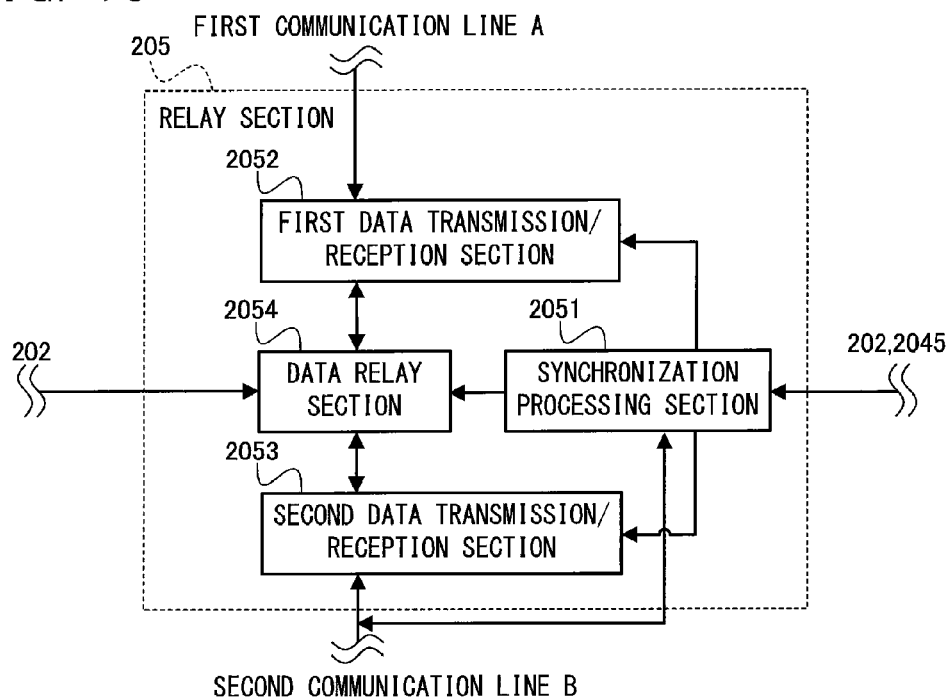
FIG. 15 is a function block diagram showing in detail a functional configuration of a relay section 205 according to the first embodiment.

This is the end of the detailed description of the determination section 204. Next, the relay section 205 will be described. FIG. 15 is a function block diagram showing further in detail a functional configuration of the relay section 205 according to the present embodiment. After the reference timing KJT to be used in the synchronization processing has been determined by the reference timing determination section 2045, the relay section 205 according to the present embodiment performs the above described synchronization processing based on the reference timing KJT determined by the reference timing determination section 2045. The relay section 205 according to the present embodiment includes a synchronization processing section 2051, a first data transmission/reception section 2052, a second data transmission/reception section 2053, and a data relay section 2054.

By using a known method in accordance with the FlexRay protocol, the synchronization processing section 2051 transmits/receives data to/from each of the second communication nodes 30a to 30d connected to the second communication line B, and thereby performs synchronization processing so that the data relay section 2054 can transmit/receive second data to/from each of the second communication nodes 30a to 30d in accordance with the schedule stored in the storage section 202.

More specifically, after the assumed timing KT determined as the reference timing KJT by the reference timing determination section 2045 is stored in the storage section 202, the synchronization processing section 2051 performs synchronization processing by transmitting/receiving data to/from each of the second communication nodes 30a to 30d using a known method defined by the FlexRay protocol, such that each of the second communication nodes 30a to 30d connected to the second communication line B can transmit/receive the second data to/from the data relay section 2054 with reference to this assumed timing KT and in accordance with the schedule stored in the storage section 202. That is, the data relay device 20 according to the present embodiment functions as a so-called leading cold start node defined by the FlexRay protocol. After completing the synchronization processing, the synchronization processing section 2051 generates synchronization processing completion information indicating that the synchronization processing has been completed. Moreover, when the synchronization processing section 2051 has completed the synchronization processing, the second communication nodes and the data relay device 20 connected to the second communication line B start transmitting/receiving the second data in accordance with the schedule.

Upon generation of the synchronization processing completion information by the synchronization processing section 2051, the first data transmission/reception section 2052 acquires the generated synchronization processing completion information. After acquiring the synchronization processing completion information and upon receiving the first data from the first communication line A, the first data transmission/reception section 2052 causes the data relay section 2054 to acquire the received first data. Moreover, after acquiring the synchronization processing completion information and upon acquiring the first data from the data relay section 2054, the first data transmission/reception section 2052 transmits the acquired first data to the first communication line A.

Upon generation of the synchronization processing completion information by the synchronization processing section 2051, the second data transmission/reception section 2053 acquires the generated synchronization processing completion information. After acquiring the synchronization processing completion information and upon receiving the second data from the second communication line B, the second data transmission/reception section 2053 causes the data relay section 2054 to acquire the received second data. Moreover, after acquiring the synchronization processing comple-tion information and upon acquiring the second data from the data relay section 2054, the second data transmission/reception section 2053 transmits the acquired second data to the second communication line B.

Upon completion of the synchronization processing by the synchronization processing section 2051, the data relay section 2054 starts relay processing for relaying the first data and for relaying the second data. After starting the relay processing, the data relay section 2054 reads from the storage section 202 information necessary for the relay such as the types of the first data predetermined to be relayed to the second communication line B, the assumed timing KT determined as the reference timing KJT, the schedule, and the relay data information.

After reading from the storage section 202 the information necessary for the relay, the data relay section 2054 counts, based on the assumed timing KT determined as the reference timing KJT and on the schedule, the time which has elapsed from the assumed timing KT by using a timer not shown or the like, and recognizes its own second transmission timings. After starting the relay processing, the data relay section 2054 identifies the above described CF relay data from among the first data which the data relay section 2054 was caused to acquire by the first data transmission/reception section 2052, and converts the CF relay data into a frame of a format in accordance with the FlexRay protocol. After converting the CF relay data, and when the counted time coincides with a corresponding second transmission timing which has been recognized, the data relay section 2054 causes the second data transmission/reception section 2053 to acquire the converted CF relay data as the second data.

On the other hand, after starting the relay processing, the data relay section 2054 identifies the type of second data indicated by the relay data information, that is, the FC relay data, from among the second data which was acquired from the second data transmission/reception section 2053, and converts the FC relay data into a frame of a format in accordance with the CAN protocol. After converting the FC relay data, the data relay section 2054 causes the first data transmission/reception section 2052 to acquire the converted FC relay data as the first data.

This is the end of the description of the functional configuration of the data relay device 20 according to the present embodiment. It should be noted that among the functional configuration of the data relay device 20 described above, the functional components included in the estimation section 203 and the determination section 204, the synchronization processing section 2051, and the data relay section 2054 may typically be realized by a control section formed by integrated circuits such as a CPU (Central Processing Unit), an LSI (Large Scale Integration), and microcomputers. The control section may function as the above functional components as appropriate, by reading predetermined programs from the storage section 202 and performing them. Further, each of the reception section 201, the first data transmission/reception section 2052, and the second data transmission/reception section 2053 may be typically realized by an interface circuit formed by communication circuits and the like which transmit/receive data through the communication line to which they are connected. Further, each of the reception section 201 and the first data transmission/reception section 2052 may be realized by the same interface circuit.

Figure 16:
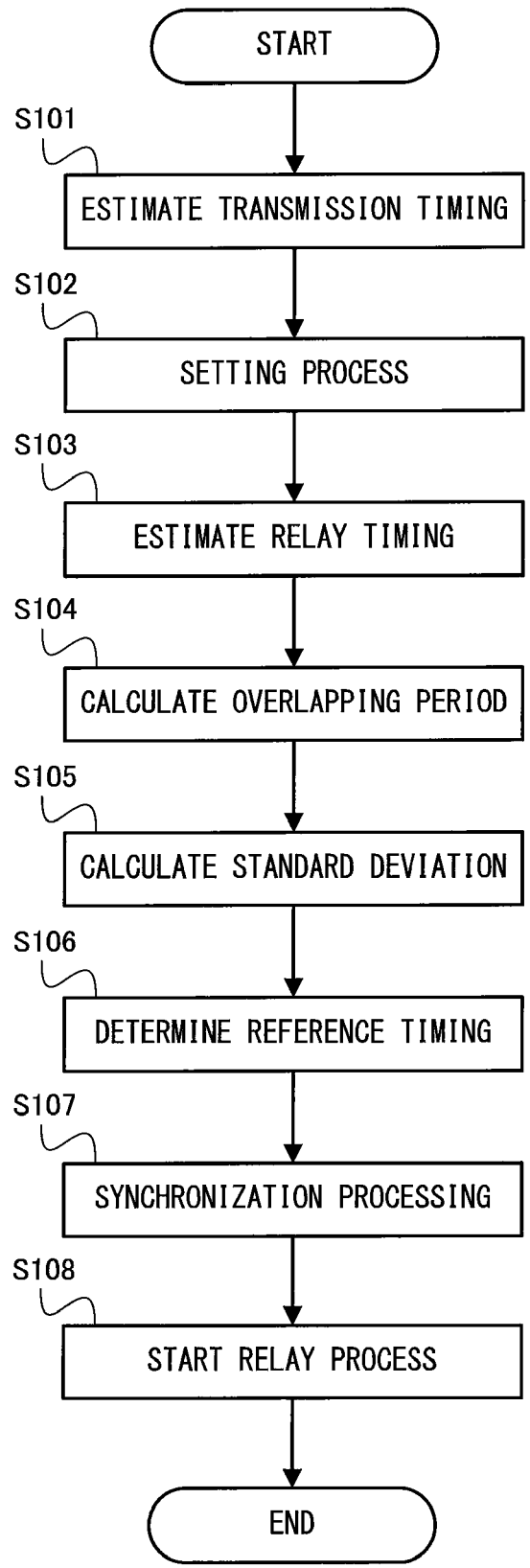
FIG. 16 is a flow chart showing processing performed by the data relay device according to the first embodiment.

Next, the processing performed by the control section as described above will be described with reference to the flow chart shown in FIG. 16. It should be noted that the flow chart shown in FIG. 16 is started automatically when the data relay device 20 is powered on.

In step S101, the control section functions as the transmission timing estimation section 2031, recognizes first transmission timings of all the types of the first data transmitted to the first communication line A as described above, and causes the storage section 202 to store the recognized first transmission timings. Upon completion of the process of step S101, the control section advances the processing to step S102.

In step S102, the control section functions as the setting section 2041, assumes and sets assumed timings KT as described above, and causes the storage section 202 to store all of the set assumed timings KT. Upon completion of the process of step S102, the control section advances the processing to step S103.

In step S103, the control section functions as the relay timing estimation section 2042, estimates first transmission timings and FC transmission timings as described above, and causes the storage section 202 to store the estimated timings. Upon completion of the process of step S103, the control section advances the processing to step S104.

In step S104, the control section functions as the calculation section 2043, calculates the length of each overlapping period of each assumed timing KT as described above, and causes the storage section 202 to store the calculated length of each overlapping period associated with a corresponding assumed timing KT. Upon completion of the process of step S104, the control section advances the processing to step S105.

In step S105, the control section functions as the standard deviation calculation section 2044, calculates a standard deviation of the calculated lengths of the respective overlapping periods of each assumed timing KT as described above, and causes the storage section 202 to store the standard deviations in association with corresponding assumed timings KT, respectively. Upon completion of the process of step S105, the control section advances the processing to step S106.

In step S106, the control section functions as the reference timing determination section 2045, determines, from among the standard deviations of the lengths of the respective overlapping periods calculated with respect to the corresponding assumed timings KT, an assumed timing KT that is associated with the smallest standard deviation of the lengths of the respective overlapping periods as a reference timing KJT as described above, and causes the storage section 202 to store the determined assumed timing KT. Upon completion of the process of step S106, the control section advances the processing to step S107.

In step S107, the control section functions as the synchronization processing section 2051, performs, as described above, synchronization processing such that the second communication nodes 30a to 30d connected to the second communication line B and the data relay section 2054 can sequentially transmit/receive the second data in accordance with a schedule which is defined with reference to the assumed timing KT stored as the reference timing KJT in the storage section 202, and then generates synchronization processing completion information. Upon completion of the process of step S107, the control section advances the processing to step S108.

In step S108, the control section functions as the data relay section 2054, and starts relay processing as described above. Upon completion of the process of step S108, the control section ends the processes shown in the flow chart in FIG. 13. However, the control section continues the relay processing which the control section has started in step S108 even after the processes shown in the flow chart in FIG. 16 have been ended.

As described above, with the data relay device 20 according to the present embodiment, the reference timing KJT is determined such that the standard deviation of the lengths of the respective overlapping periods described with reference to FIG. 13 and FIG. 14 becomes smallest. Therefore, it is possible to prevent the relay delay time period caused by the above described arbitration processing from being significantly delayed.

(First Modification of First Embodiment)

In the first data information described in the first embodiment above, each type of the first data is indicated in association with its corresponding CAN-ID, information category, transmission cycle, and transmission start interval. However, even if the transmission start interval is not indicated by the first data information, the first transmission timings can be estimated for each type of all of the first data transmitted from the first communication nodes connected to the first communication line A, as the transmission timing estimation section 2031 according to the first embodiment does.

Figures 17, 18:
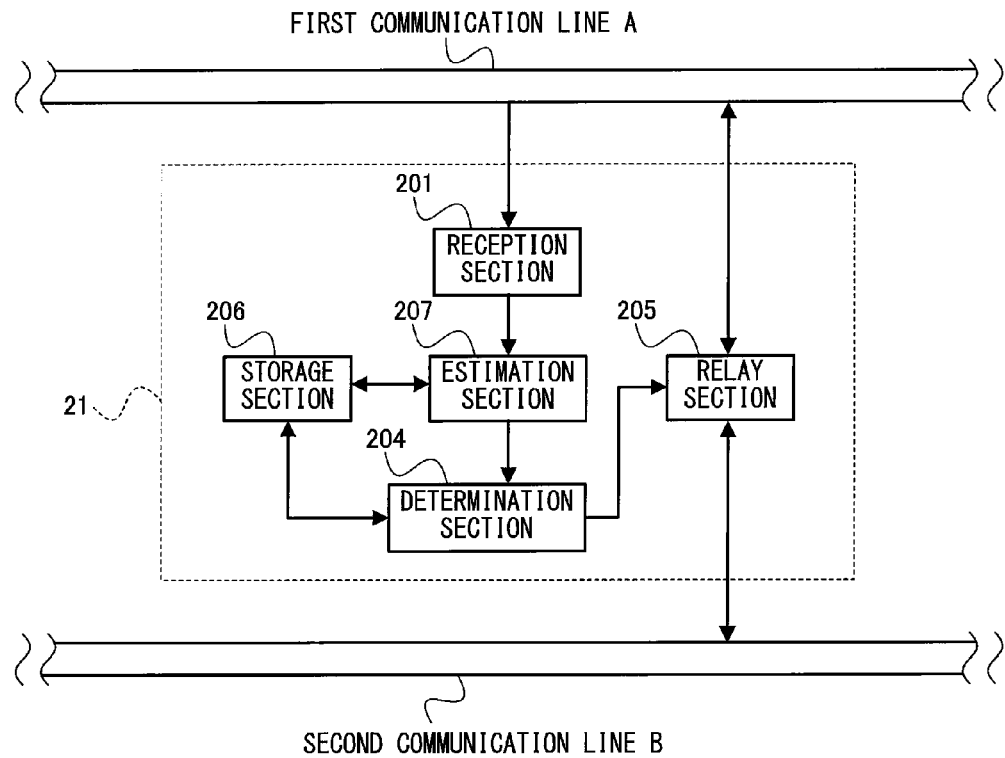
FIG. 17 is a function block diagram showing a functional configuration of a data relay device according to a first modification of the first embodiment.
FIG. 18 shows an example of first data information in the first modification of the first embodiment.

FIG. 17 is a function block diagram showing in detail a functional configuration of a data relay device 21 according to a first modification of the first embodiment. The data relay device 21 according to the present modification is different from the data relay device 20 according to the first embodiment, in that the data relay device 21 includes a storage section 206 instead of the storage section 202 and an estimation section 207 instead of the estimation section 203. Therefore, the same functional components in the data relay device 21 according to the present modification and in the data relay device 20 according to the first embodiment are denoted by the same reference numerals, respectively, and description thereof will be omitted.

As shown as an example in FIG. 18, the storage section 206 according to the present modification stores in advance first data information indicating the types of first data in association with the first communication nodes 10a to 10d, the CAN-IDs 1 to 9, the information categories D1 to D9, and the transmission cycle TD1 to TD9. As apparent from FIG. 18, the first data information stored in the storage section 206 according to the present modification does not indicate the transmission start interval of each type of the first data, unlike the first data information stored in the storage section 202 according to the first embodiment. Other information stored in the storage section 206 according to the present modification is similar to the information stored in the storage section 202 according to the first embodiment.

Figure 19:
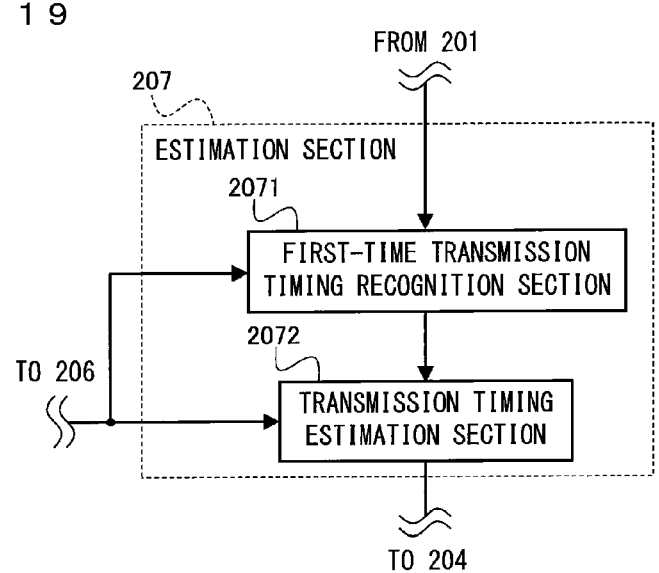
FIG. 19 is a function block diagram showing further in detail a functional configuration of an estimation section according to the first modification of the first embodiment.

FIG. 19 is a function block diagram showing further in detail a functional configuration of the estimation section 207 according to the present modification. The estimation section 207 according to the present modification includes a first-time transmission timing recognition section 2071 and a transmission timing estimation section 2072.

When a piece of first data is received by the reception section 201 from the first communication line A, the first-time transmission timing recognition section 2071 acquires the received piece of first data. After the data relay device 21 has started operation and each time the first-time transmission timing recognition section 2071 acquires a piece of first data from the reception section 201, the first-time transmission timing recognition section 2071 causes the storage section 206 to store the piece of first data in association with the time at which the piece of first data is acquired, which is a reception time. Moreover, after the data relay device 21 has started operation and each time the first-time transmission timing recognition section 2071 acquires a piece of first data from the reception section 201, the first-time transmission timing recognition section 2071 determines whether a piece of first data transmitted by each of all of the first communication nodes connected to the first communication line A has been received at least once.

More specifically, after the data relay device 21 has started operation and each time the first-time transmission timing recognition section 2071 causes the storage section 206 to store the piece of first data, which the first-time transmission timing recognition section 2071 has been caused to acquire by the reception section 201, in association with the reception time thereof, the first-time transmission timing recognition section 2071 compares the first data information stored in the storage section 206 with the type of each piece of first data acquired from the reception section 201 and stored in the storage section 206. By comparing the type of each piece of first data stored in the storage section 206 with the first data information, the first-time transmission timing recognition section 2071 determines whether at least one piece of each of all the types of first data indicated by the first data information is stored in the storage section 206.

Upon determination that at least one piece of all types of first data indicated by the first data information is stored in the storage section 206, the first-time transmission timing recognition section 2071 calculates the transmission start interval described in the first embodiment for each type of the first data, based on the reception time at which the first data of the type is received for the first time (hereinafter referred to as first-time reception time).

When calculating a transmission start interval for each type of the first data, the first-time transmission timing recognition section 2071 sorts, with reference to the first data information, the pieces of first data stored in the storage section 206 associated with an identical first communication node, into a group. The pieces of first data collected in a group are the pieces of first data transmitted from an identical first communication node. After sorting the pieces of first data stored in the storage section 206 into groups, the first-time transmission timing recognition section 2071 identifies a piece of first data having the earliest reception time among the pieces of first data in each group. The piece of first data having the earliest reception time that has been identified for each group is the first-time transmission data of the corresponding first communication node that has transmitted the pieces of first data sorted in the group.

After identifying the first-time transmission data for each of the first communication nodes connected to the first communication line A, the first-time transmission timing recognition section 2071 calculates the differences between the first-time reception times of the pieces of first data in each group and the first-time reception time of the first-time transmission data belonging to the group, as transmission start intervals of the pieces of first data of the group, and then causes the storage section 206 to additionally store the transmission start intervals in association with the corresponding types of the first data, respectively, in the first data information stored in the storage section 206. It should be noted that when calculating a transmission start interval, the first-time transmission timing recognition section 2071 calculates the difference between the first-time reception time of the first-time transmission data and the first-time reception time of a piece of first data, for each type of the first data. Therefore, the transmission start interval of the first-time transmission data is 0.

After the first-time transmission timing recognition section 2071 causes the storage section 206 to additionally store the transmission start intervals in association with the corresponding types of the first data, respectively, the transmission timing estimation section 2072 estimates first transmission timings for each type of all the first data transmitted from the first communication nodes connected to the first communication line A, as the transmission timing estimation section 2031 according to the first embodiment does.

More specifically, when the first-time transmission timing recognition section 2071 calculates the transmission start interval of each of all the types of first data transmitted from the first communication nodes connected to the first communication line A as described above, the first-time transmission timing recognition section 2071 has received all the pieces of first-time transmission data transmitted from all of the first communication nodes connected to the first communication line A, respectively. Therefore, when the first-time transmission timing recognition section 2071 has calculated the transmission start intervals of all the types of the first data, respectively, the transmission timing estimation section 2072 according to the present modification determines that all the pieces of first-time transmission data transmitted from all of the first communication nodes connected to the first communication line A have been received, and then estimates first transmission timings for all the types of first data, transmitted from all of the first communication nodes connected to the first communication line A, similarly to the transmission timing estimation section 2031 according to the first embodiment.

In this manner, without causing the storage section 206 to store a transmission start interval for each type of first data as the first data information described in the first embodiment, and after calculating a transmission start interval for each type of first data, the data relay device 21 according to the present modification can estimate transmission timings for all the types of first data transmitted from the first communication nodes connected to the first communication line A, similarly to the first embodiment.

(Second Modification of First Embodiment)

In the first modification of the first embodiment described above, in a case where the transmission start intervals are not stored as the first data information, first transmission timings are estimated, as in the first embodiment, for each of all the types of first data transmitted from all of the first communication nodes connected to the first communication line A. However, even in a case where the transmission start intervals and the transmission cycles are not indicated in the first data information, first transmission timings can be estimated for each of all the types of first data transmitted from the first communication nodes connected to the first communication line A, in a similar manner by the transmission timing estimation section 2031 according to the first embodiment.

Figure 20:
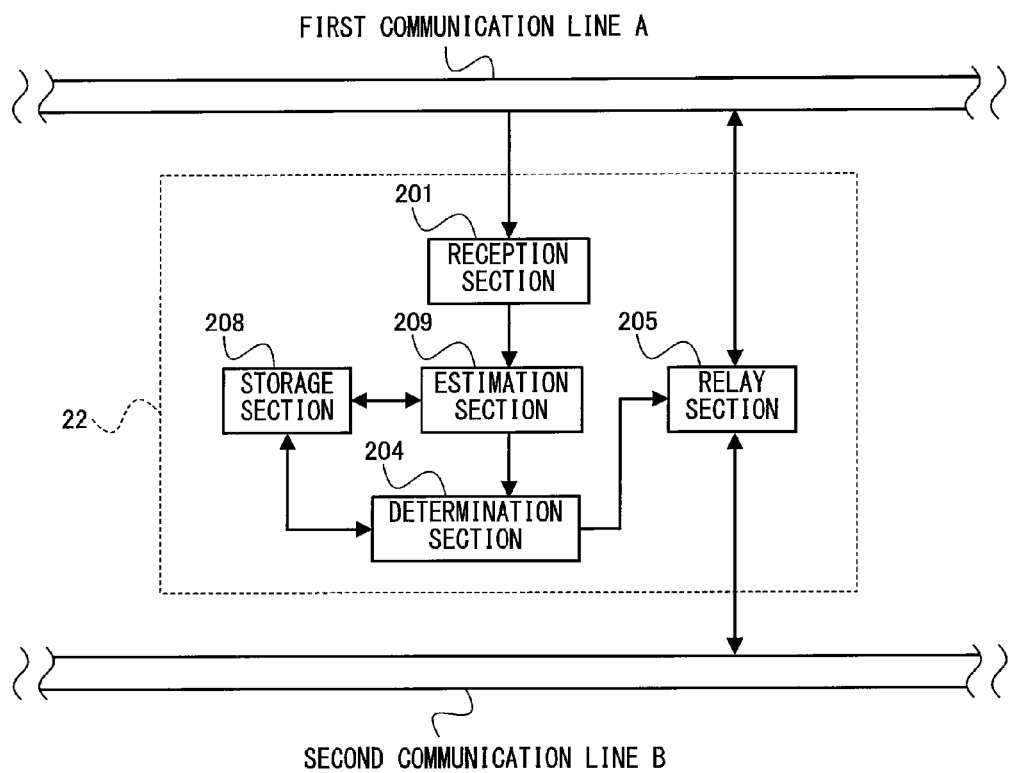
FIG. 20 is a function block diagram showing a functional configuration of a data relay device according to a second modification of the first embodiment.

FIG. 20 is a function block diagram showing further in detail a functional configuration of a data relay device 22 according to a second modification of the first embodiment. The data relay device 22 according to the present modification is different from the data relay device 22 according to the first embodiment in that the data relay device 22 includes a storage section 208 instead of the storage section 202 and an estimation section 209 instead of the estimation section 203. Therefore, the same functional components in the data relay device 22 according to the present modification and in the data relay device 20 according to the first embodiment are denoted by the same reference numerals, respectively, and description thereof will be omitted.

Figures 21, 22:
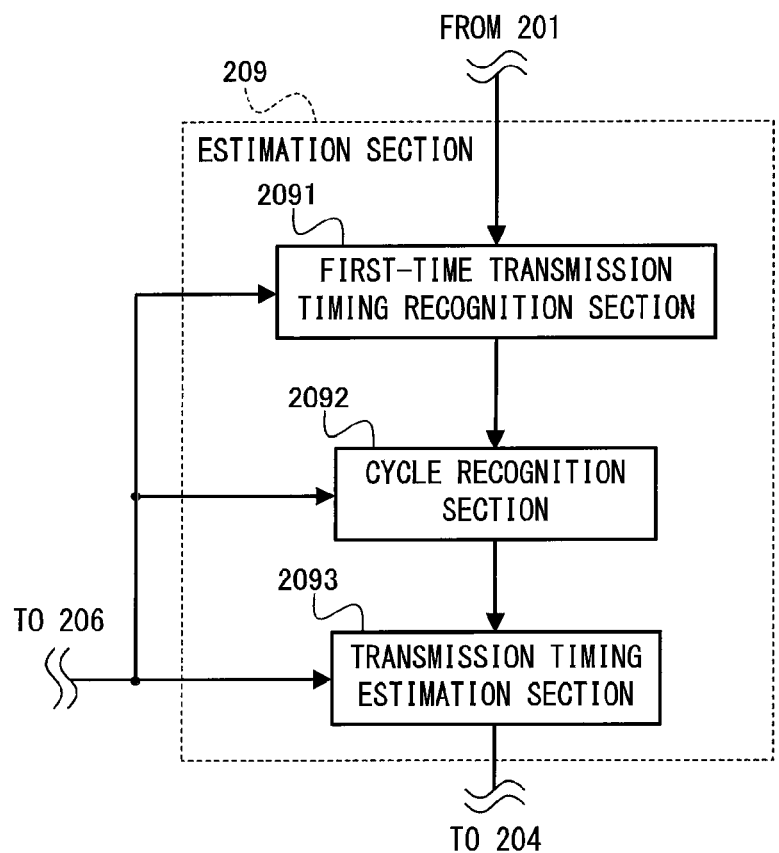
FIG. 21 shows an example of first data information in the second modification of the first embodiment.
FIG. 22 is a function block diagram showing further in detail a functional configuration of an estimation section according to the second modification of the first embodiment.

As shown in an example in FIG. 21, the storage section 208 according to the present modification stores in advance the first communication nodes 10a to 10d, the CAN-IDs 1 to 9, and the information categories D1 to D9 in association with corresponding types of the first data. The first data information stored in the storage section 208 according to the present modification is different from the first data information stored in the storage section 202 according to the first embodiment in that the former does not indicate the transmission start interval and the transmission cycle for each type of first data. Other information stored in the storage section 208 according to the present modification is similar to the information stored in the storage section 202 according to the first embodiment.

FIG. 22 is a function block diagram showing further in detail a functional configuration of the estimation section 209 according to the present modification. The estimation section 209 according to the present modification includes a first-time transmission timing recognition section 2091, a cycle recognition section 2092, and a transmission timing estimation section 2093.

Similarly to the first-time transmission timing recognition section 2071 according to the first modification of the first embodiment, the first-time transmission timing recognition section 2091 calculates a transmission start interval for each type of first data transmitted from the first communication nodes connected to the first communication line A, and causes the transmission start intervals to be additionally stored in the first data information which is stored in the storage section 208.

After the transmission start intervals calculated for the respective types of first data are caused to be stored in the storage section 208 by the first-time transmission timing recognition section 2091, the cycle recognition section 2092 calculates a transmission cycle for each type of first data transmitted from the first communication nodes connected to the first communication line A.

When calculating a transmission cycle, the cycle recognition section 2092 firstly determines, for each type of the first data, whether at least two pieces of first data of an identical type have been received. The cycle recognition section 2092 determines whether at least two pieces of first data of an identical type have been received, by determining whether at least two pieces of first data of an identical type are stored in the storage section 208. When the cycle recognition section 2092 has determined, for all of the types of the first data, that at least two pieces of first data of the type have not been received, the cycle recognition section 2092 waits until at least two pieces of first data of all of the types are received. On the other hand, when the cycle recognition section 2092 has determined that at least two pieces of first data of all of the types have been received, the cycle recognition section 2092 calculates a transmission cycle for each type of first data, based on the reception times of the received at least two pieces of first data of the type.

When calculating a transmission cycle of a piece of first data, the cycle recognition section 2092 calculates, from among the reception times of the first data of an identical type, the time interval between the reception time of a piece of first data that was received first and the reception time of a piece of first data that was received next, as a transmission cycle of the type of the first data. After calculating transmission cycles for respective types of the first data, the cycle recognition section 2092 causes the calculated transmission cycles, in association with the corresponding types of the first data, to be additionally stored in the first data information which is stored in the storage section 208.

After the cycle recognition section 2092 causes the transmission cycles in association with the corresponding types of first data to be additionally stored in the first data information which is stored in the storage section 208, the transmission timing estimation section 2093 estimates transmission timings of all the types of the first data transmitted from the first communication nodes connected to the first communication line A, similarly to the transmission timing estimation section 2031 according to the first embodiment.

More specifically, when the cycle recognition section 2092 calculates the transmission cycle for each type of all the first data, the cycle recognition section 2092 has received all the pieces of first-time transmission data transmitted from all of the first communication nodes connected to the first communication line A. Therefore, when the cycle recognition section 2092 has calculated the transmission cycles of all the types of first data, respectively, the transmission timing estimation section 2093 according to the present modification determines that all the pieces of first-time transmission data transmitted from all the first communication nodes connected to the first communication line A have been received, and then estimates first transmission timings for each of all the types of first data transmitted from all of the first communication nodes connected to the first communication line A, similarly to the transmission timing estimation section 2031 according to the first embodiment.

In this manner, without causing the storage section 208 to store a transmission start interval and a transmission cycle for each type of first data as the first data information described in the first embodiment, and after calculating a transmission start interval and a transmission cycle for each type of first data, the data relay device 22 according to the present modification can estimate transmission timings for all the types of first data transmitted from the first communication nodes connected to the first communication line A, similarly to the first embodiment.

(Third Modification of First Embodiment)

In the first embodiment, an assumed timing KT used as the reference timing KJT is determined based on the standard deviation of the lengths of the respective overlapping periods calculated for each assumed timing KT. However, the present invention may determine an assumed timing KT used as the reference timing KJT based on the sum of the lengths of the respective overlapping periods calculated for each assumed timing KT.

Figure 23:
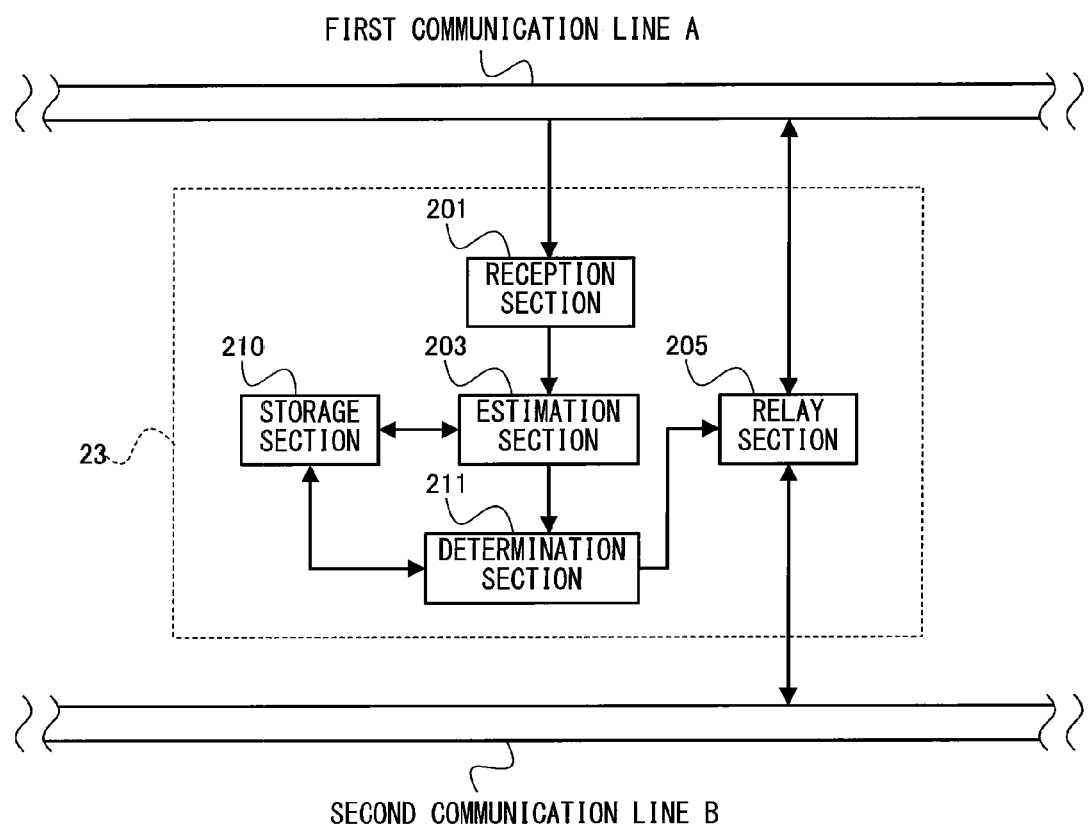
FIG. 23 is a function block diagram showing a functional configuration of a data relay device according to a third modification of the first embodiment.

FIG. 23 is a function block diagram showing further in detail a functional configuration of a data relay device 23 according to a third modification of the first embodiment. The data relay device 23 according to the present modification is different from the data relay device 20 according to the first embodiment in that the data relay device 23 includes a storage section 210 instead of the storage section 202 and a determination section 211 instead of the determination section 204. Therefore, the same functional components in the data relay device 23 according to the present embodiment and in the data relay device 20 according to the first embodiment are denoted by the same reference numerals, respectively, and description thereof will be omitted.

The storage section 210 stores information similar to that stored in the storage section 202 according to the first embodiment. The difference is that the storage section 210 according to the present modification stores information that the determination section 211 according to the present modification causes the storage section 210 to store instead of the information that the determination section 204 according to the first embodiment cause the counter part in the first embodiment to store.

Figure 24:
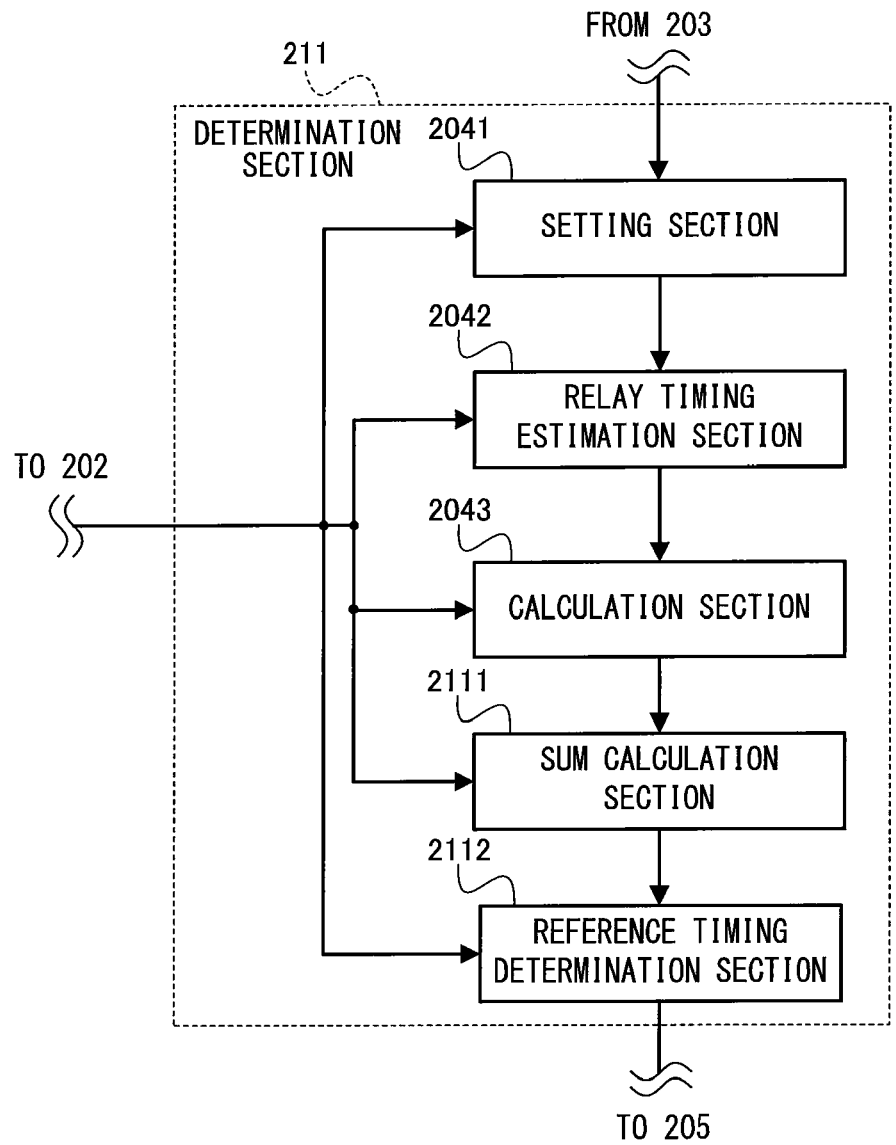
FIG. 24 is a function block diagram showing further in detail a functional configuration of a determination section according to the third modification of the first embodiment.

FIG. 24 is a function block diagram showing further in detail a functional configuration of the determination section 211 according to the present modification. The determination section 211 according to the present modification is different in that it includes a sum calculation section 2111 and a reference timing determination section 2112 instead of the standard deviation calculation section 2044 and the reference timing determination section 2045 according to the first embodiment. Therefore, the same functional components in the determination section 211 according to the present modification and in the determination section 204 according to the first embodiment are denoted by the same reference numerals, respectively, and description thereof will be omitted.

After the length of each overlapping period for each assumed timing KT is caused to be stored in the storage section 210 by the calculation section 2043, the sum calculation section 2111 calculates the sum of the lengths of the respective overlapping periods of each assumed timing KT stored in the storage section 210, and causes the storage section 210 to store each calculated sum of the lengths of the respective overlapping periods in association with the corresponding assumed timing KT.

When the sum of the lengths of the respective overlapping periods calculated for each assumed timing KT by the sum calculation section 2111 is stored in the storage section 210, the reference timing determination section 2112 identifies an assumed timing KT that is associated with the smallest sum of the lengths of the respective overlapping periods among the sums of the lengths of the stored respective overlapping periods.

After identifying the assumed timing KT associated with the smallest sum of the lengths of the respective overlapping periods, the reference timing determination section 2112 determines the identified assumed timing KT as the reference timing KJT to be used in performing synchronization processing, and causes the storage section 210 to store the identified assumed timing KT.

In this manner, with the data relay device 23 according to the present modification, it is possible to determine a reference timing KJT such that the reference timing KJT is associated with the smallest sum of the lengths of the respective overlapping periods calculated for each assumed timing KT, and thus to prevent the relay delay time period from being significantly prolonged.

Second Embodiment

In a second embodiment, the configuration of the network is the same as that of the network 1 shown in FIG. 1 described in the first embodiment. The first data is transmitted/received in accordance with an event trigger type communication protocol in the first network, and the second data is transmitted/received in accordance with a time trigger type communication protocol in the second network. Also in the present embodiment, the CAN protocol is used as an example of the event trigger type communication protocol and the FlexRay protocol is used as an example of the time trigger type communication protocol, as in the first embodiment.

In the first embodiment, when FC relay data is relayed from the second communication line B to the first communication line A, that is, when FC relay data is relayed from the second network using the FlexRay protocol to the first network using the CAN protocol, the reference timing KJT in the second network is determined in such a manner as to prevent significant prolongation of the relay delay time period due to arbitration processing.

In contrast, in the second embodiment, the reference timing KJT in the second network is determined in such a manner as to prevent significant prolongation of the relay delay time period that occurs when the data relay device receives CF relay data to be relayed from the first network using the CAN protocol to the second network using the FlexRay protocol and then relays and transmits the received CF relay data as the second data to the second communication line B.

More specifically, as described in the first embodiment, each of the second communication nodes and the data relay device forming the second network transmits/receives data in accordance with a predetermined schedule. On the other hand, in the first network, each of the first communication nodes and the data relay device transmits/receives data at a timing when it has become necessary to transmit the data. Therefore, there occurs a relay delay time period that is a period from the time the data relay device receives CF relay data from the first network until a second transmission timing arrives at which the data relay device relays and transmits in the second network the CF relay data in accordance with an order set in the data relay device (hereinafter referred to as CF relay timing), and in the relay delay time period the CF relay data cannot be relayed.

Such a relay delay time period occurring in this manner is changed if the reference timing KJT is changed. This is because second transmission timings set in the data relay device in the second network are in accordance with a predetermined schedule which is defined with reference to the reference timing KJT described in the first embodiment.

Therefore, in the present embodiment, a reference timing KJT in the second network is determined based on first transmission timings of each of all types of first data transmitted from the first communication nodes connected to the first communication line A, such that a relay delay time period when CF relay data is relayed from the first network to the second network is not significantly prolonged.

Figures 25, 26:
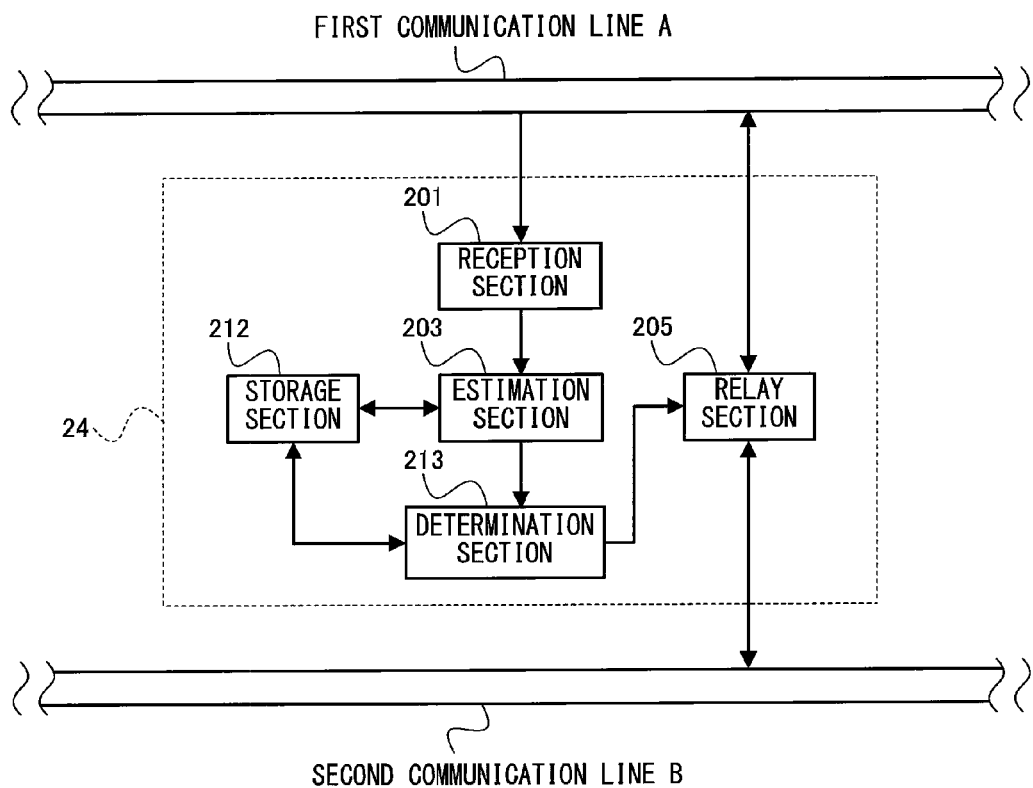
FIG. 25 is a function block diagram showing a functional configuration of a data relay device according to a second embodiment.
FIG. 26 shows an example of relay data information in the second embodiment.

FIG. 25 is a function block diagram showing further in detail a functional configuration of a data relay device 24 according to the second embodiment. The data relay device 24 according to the present embodiment is different from the data relay device 20 according to the first embodiment in that the data relay device 24 includes a storage section 212 instead of the storage section 202 and a determination section 213 instead of the determination section 204. Therefore, the same functional components in the data relay device 24 according to the present embodiment and in the data relay device 20 according to the first embodiment are denoted by the same reference numerals, respectively, and description thereof will be omitted.

The storage section 212 stores the first data information described in the first embodiment, a schedule, and relay data information. The relay data information indicates types of pieces of first data that are predetermined to be relayed and transmitted as the second data, which is the above described CF relay data, to the second communication line B, among pieces of the first data transmitted from the first communication nodes 10a to 10d to the first communication line A. FIG. 26 shows an example of the relay data information stored in the storage section 212. As shown in FIG. 26, in the present embodiment, the relay data information indicating, as the CF relay data, the types of the first data to be relayed from the first communication line A to the second communication line B is stored in the storage section 212. Further, the information stored in the storage section 212 according to the present embodiment includes information which the storage section 212 is caused to store by the estimation section 203 and by the determination section 213 described below.

The determination section 213 determines a reference timing KJT in the above described FlexRay protocol, based on the first transmission timings estimated by the transmission timing estimation section 2031 and on the above described schedule stored in the storage section 212.

Figure 27:
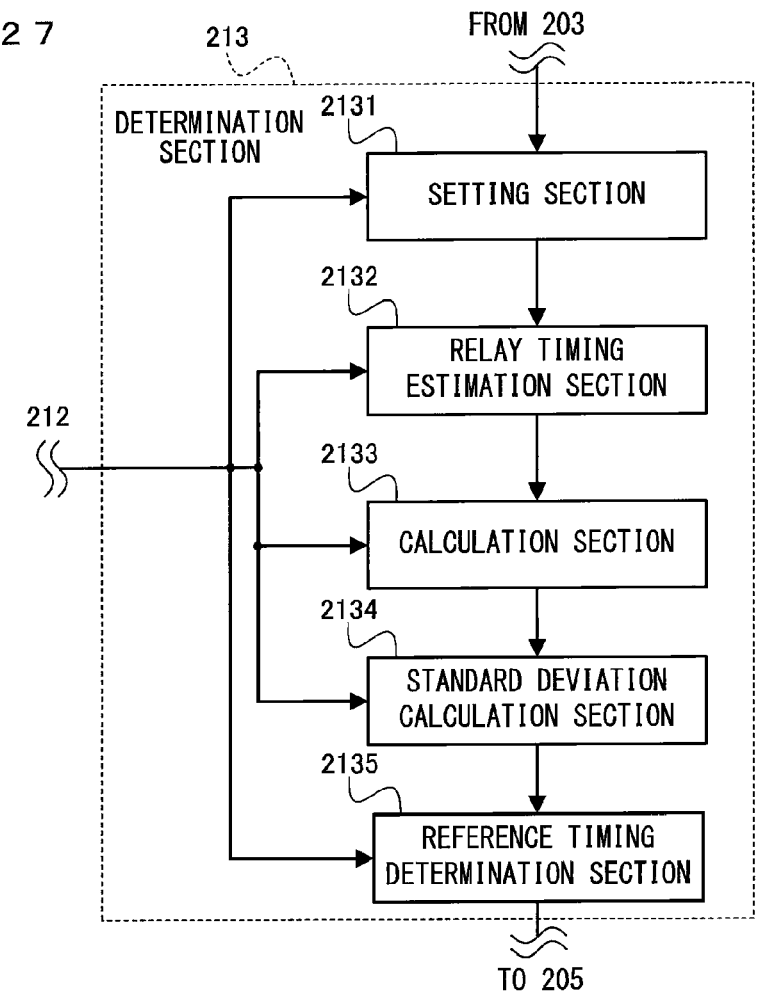
FIG. 27 is a function block diagram showing further in detail a functional configuration of a determination section according to the second embodiment.

FIG. 27 is a function block diagram showing further in detail a configuration of the determination section 213 according to the present embodiment. The determination section 213 according to the present embodiment includes a setting section 2131, a relay timing estimation section 2132, a calculation section 2133, a standard deviation calculation section 2134, and a reference timing determination section 2135.

The setting section 2131 has the same functional configuration as that of the setting section 2041 described in the first embodiment. Similarly to the setting section 2041, the setting section 2131 assumes and sets assumed timings KT, and causes the storage section 212 to store all of the set assumed timings KT.

When all of the assumed timings KT are caused to be stored in the storage section 212 by the setting section 2131, the relay timing estimation section 2132 estimates first transmission timings of pieces of CF relay data, as CF transmission timings, among all of the first transmission timings caused to be stored in the storage section 212 by the transmission timing estimation section 2031.

Figure 28:
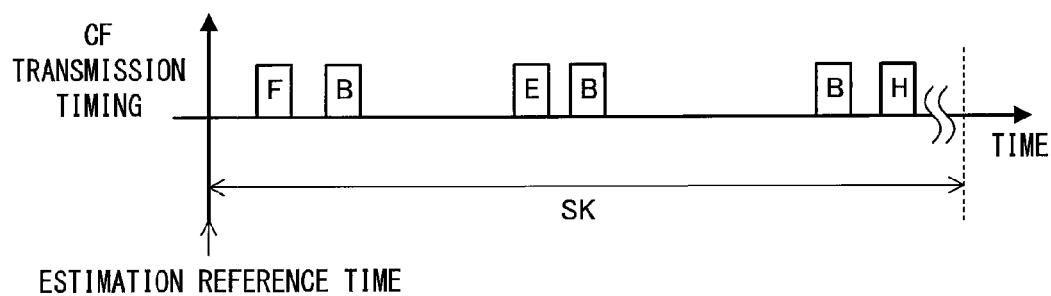
FIG. 28 is an example of transmission timings of CF relay data in the second embodiment.

FIG. 28 shows an example of CF transmission timings of the types B, E, F, and H of data indicated by the relay data information shown as an example in FIG. 26. FIG. 28 shows an example of CF transmission timings that will arrive in one least common multiple period SK counted with reference to an estimation reference timing, among the first transmission timings estimated by the transmission timing estimation section 2031 as described above.

Figure 29:
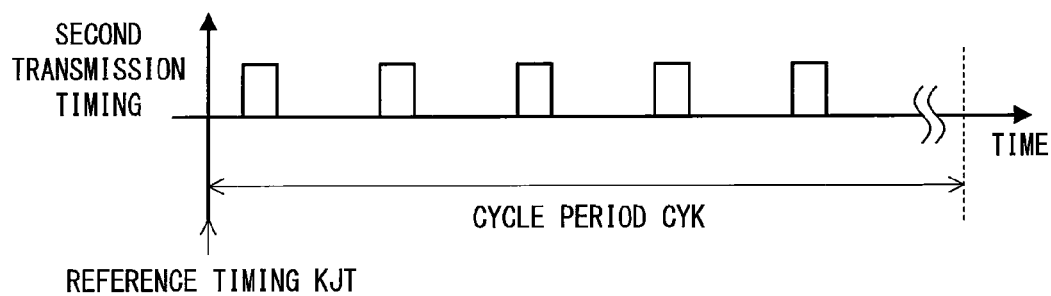
FIG. 29 shows an example of transmission timings in a second network of the data relay device according to the second embodiment.

After recognizing the CF transmission timings in the least common multiple period SK counted with reference to the estimation reference time, the relay timing estimation section 2132 also recognizes second transmission timings which are counted with reference to a reference timing KJT and are allotted in advance to the data relay device 24, based on the schedule stored in the storage section 212. FIG. 29 shows an example of second transmission timings allotted in advance to the data relay device 24, the second transmission timings arriving, in a cycle period CYK counted with reference to a reference timing KJT, in accordance with a schedule defined with reference to the reference timing KJT as described above.

Figure 30:
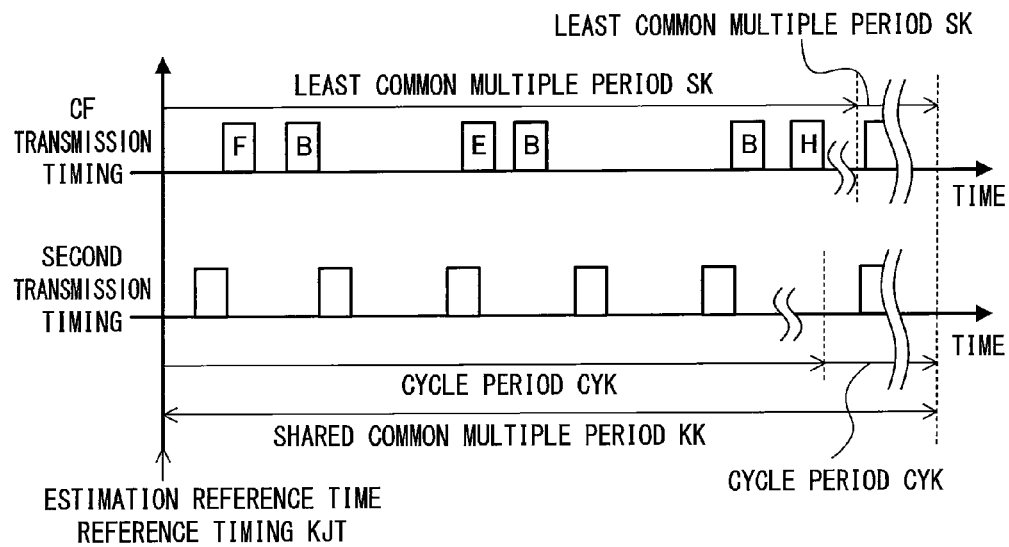
FIG. 30 shows an example of timings estimated by a relay timing estimation section according to the second embodiment.

After recognizing the second transmission timings in the cycle period CYK counted with reference to the reference timing KJT and the CF transmission timings counted with reference to the estimation reference time, the relay timing estimation section 2132 estimates, as shown in an example in FIG. 30, timings at which the recognized second transmission timings will arrive in a shared common multiple period KK described above and timings at which the CF transmission timings will arrive in a shared common multiple period KK described above. After estimating all of the second transmission timings and all of the CF transmission timings that will arrive in the shared common multiple period KK counted with reference to the estimation reference time, the relay timing estimation section 2132 causes the storage section 212 to store the estimated timings.

After the relay timing estimation section 2132 has caused the storage section 212 to store all of the second transmission timing and the CF transmission timings arriving in the shared common multiple period KK, the calculation section 2133 calculates delay periods between the CF transmission timings arriving in the shared common multiple period KK counted with reference to the estimation reference time and the second transmission timings arriving in the shared common multiple period KK counted with reference to the reference timing KJT, while shifting the reference timing KJT of the shared common multiple period KK counted with reference to the reference timing KJT to an assumed timing KT set by the setting section 2131.

Figure 31:
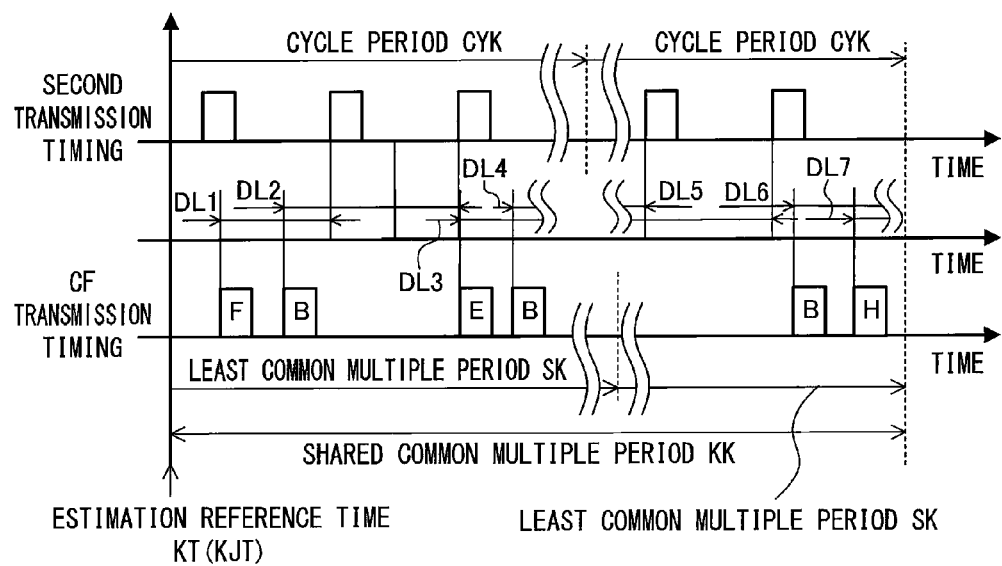
FIG. 31 shows an example of delay periods in the second embodiment.

FIG. 31 shows an example of the delay periods calculated by the calculation section 2133. FIG. 31 shows, as an example of the delay periods calculated by the calculation section 2133, delay periods between the CF transmission timings arriving in a shared common multiple period KK counted with reference to an estimation reference time and the second transmission timings counted with reference to a reference timing KJT that has been made to coincide with an assumed timing KT set at the estimation reference time.

As shown in the example in FIG. 31, by comparing the second transmission timings with the CF transmission timings, the calculation section 2133 calculates the length of each delay period in the shared common multiple period KK counted with reference to the reference timing KJT that has been made to coincide with the assumed timing KT. FIG. 31 shows, as an example of the lengths calculated for respective delay periods, lengths DL1 to DL7 of the respective delay periods calculated by the calculation section 2133.

Moreover, the calculation section 2133 calculates the lengths of respective delay periods by comparing the CF transmission timings arriving in a shared common multiple period KK counted with reference to an estimation reference time, with the second transmission timings counted with reference to a reference timing KJT that has been made to coincide with another assumed timing KT that has been set by the setting section 2131 to a time point different from the estimation reference time, and performs this calculation for every assumed timing KT. Then, the calculation section 2133 causes the storage section 212 to store the lengths of the respective delay periods calculated for each assumed timing KT, in association with the corresponding assumed timing KT.

After the lengths of the respective delay periods for each assumed timing KT calculated by the calculation section 2133 are stored in the storage section 212, the standard deviation calculation section 2134 calculates, for each assumed timing KT, a standard deviation of the lengths of the respective delay periods stored in the storage section 212, and causes the storage section 212 to store the calculated standard deviation of the lengths of the respective delay periods of each assumed timing KT, in association with the corresponding assumed timing KT.

The standard deviation calculation section 2134 calculates the standard deviation of the lengths of the respective delay periods for each assumed timing KT, by using the formula (2) below.

$$\sigma_b = \sum_{i=0}^{n} \sqrt{(Dlm - Dli)^2} \quad (2)$$

Here, Dlm is an average value of the delay periods associated with an assumed timing KT. The symbol n is the number of delay periods that have been detected.

The reference timing determination section 2135 identifies an assumed timing KT associated with the smallest standard deviation among the standard deviations of the lengths of the respective delay periods which the storage section 212 has been caused to store for each of all of the assumed timings KT by the standard deviation calculation section 2134. The reference timing determination section 2135 determines the identified assumed timing KT as the reference timing KJT to be used in performing synchronization processing, and causes the storage section 212 to store the assumed timing KT.

This is the end of the description of the functional configuration of the data relay device 24 according to the present embodiment. It should be noted that among the functional components included in the data relay device 24 described above, the functional components included in the estimation section 203 and the determination section 213, the synchronization processing section 2051, and the data relay section 2054 may typically be a control section formed by integrated circuits such as a CPU, an LSI, and microcomputers, as in the first embodiment. The control section may function as the above functional components as appropriate, by reading predetermined programs from the storage section 212 and performing them.

Figure 32:
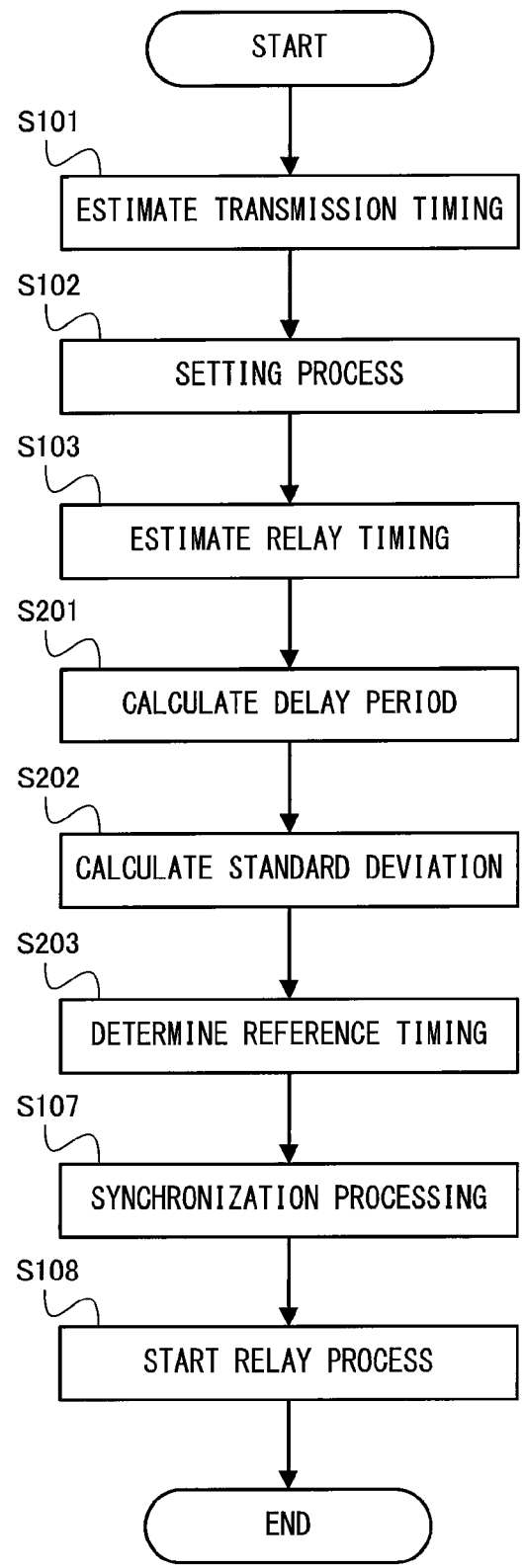
FIG. 32 is a flow chart showing processing performed by the data relay device according to the second embodiment.

Next, processing performed by the control section as described above will be described with reference to the flow chart shown in FIG. 32. It should be noted that processes shown in the flow chart in FIG. 32 are automatically started when the data relay device 24 is powered on. Of the processes shown in the flow chart in FIG. 32, the same processes as those shown in the flow chart in FIG. 16 are denoted by the same reference numerals, and description thereof will be omitted.

Upon completion of the process of step S103, the control section according to the second embodiment advances the processing to step S201. In step S201, the control section functions as the calculation section 2133, calculates the length of each delay period for each assumed timing KT as described above, and causes the storage section 212 to store the calculated length of each delay period in association with the corresponding assumed timing KT. Upon completion of the process of step S201, the control section advances the processing to step S202.

In step S202, the control section functions as the standard deviation calculation section 2134, calculates the standard deviation of the lengths of the respective delay periods calculated for each assumed timing KT as described above, and causes the storage section 212 to store the calculated standard deviation in association with the corresponding assumed timing KT. Upon completion of the process of step S202, the control section advances the processing to step S203.

In step S203, the control section functions as the reference timing determination section 2135, determines an assumed timing KT associated with the smallest standard deviation of the lengths of the respective delay periods, as a reference timing KJT, among the standard deviations of the lengths of the respective delay periods, the standard deviations having been calculated for the respective assumed timings KT as described above, and causes the storage section 212 to store the determined assumed timing KT. Upon completion of the process of step S203, the control section advances the processing to step S107.

In this manner, with the data relay device 24 according to the present embodiment, the reference timing KJT is determined such that the standard deviation of the delay periods when data is relayed from the first network to the second network becomes smallest. Therefore, it is possible to prevent the delay period from being significantly prolonged.

It should be noted that the data relay device 24 according to the second embodiment may be modified in a similar manner in which the data relay device 20 according to the first embodiment is modified into the data relay device 21 according to the first modification of the first embodiment or into the data relay device 22 according to the second modification of the first embodiment.

Moreover, the data relay device 24 according to the second embodiment may be modified in such a manner as to determine a reference timing KJT not based on the standard deviation of the lengths of the respective delay periods but based on the sum of the lengths of the delay respective periods, in a similar manner in which the data relay device 20 according to the first embodiment is modified in such a manner as to determine a reference timing KJT not based on the standard deviation of the lengths of the respective overlapping periods but based on the sum of the lengths of the respective overlapping periods as in the third modification of the first embodiment.

In the first embodiment described above, a reference timing KJT is determined such that an overlapping period when FC relay data is relayed from the second network using a time trigger type communication protocol to the first network using an event trigger type communication protocol is not significantly prolonged. Meanwhile, in the second embodiment described above, a reference timing is determined such that a delay period when CF relay data is relayed from the first network using an event trigger type communication protocol to the second network using a time trigger type communication protocol is not significantly prolonged. In the present invention, in order to prevent overlapping periods and delay periods from being significantly prolonged, the first embodiment and the second embodiment may be combined to calculate overlapping periods and delay periods. Then, a reference timing KJT may be determined such that each of both types of calculated periods may satisfy a given requirement.

Further, in all of the embodiments and all of the modifications described above, for example, by assuming assumed timings KT only within a predetermined time period from the time which is used as a reference for a shared common multiple period KK, it is possible to reduce processing load on the control section when the control section calculates the lengths of respective overlapping periods or the lengths of respective delay periods for each assumed timing KT.

Further, each of the relay delay time period, the overlapping period, and the delay period described above can be considered as a stay period in which CF relay data or FC relay data stays in a data relay device until they are relayed by the data relay device.

The transmission speed realized by a FlexRay protocol is faster than the transmission speed realized by a CAN protocol. Therefore, by applying the data relay device according to the present invention to a movable body such as a vehicle, and by causing the data relay device to relay data between a network using a CAN protocol and a network using a FlexRay protocol, advanced control of the movable body such as a vehicle can be realized. For example, conventionally, a movable body such as a vehicle is provided with a radar device which measures a relative distance and a relative speed between the movable body and an object (approaching vehicle, pedestrian, object set on the road, and the like), and a system which determines conditions of the driver (for example, dozing, and inattentive driving, and the like) based on a taken image of the face of the driver, and the like.

Combination of such a device and a system has made a collision prevention system or the like practical which predicts, for example, a collision between an own vehicle and the object and which issues an alarm to the driver based on the result of the prediction and the condition of the driver. If a time trigger type communication protocol such as the FlexRay protocol described in the present invention is used, it is possible to provide more advanced control such as automatic steering of the steering wheel, such automatic steering being enabled when it is determined, for example, that there is a possibility of collision between the own vehicle and an approaching vehicle, based on the prediction result and the condition of the driver. On the other hand, the CAN protocol described in the present invention is also already used in many networks in a movable body such as a vehicle. Since the data relay device according to the present invention can prevent significant prolongation of a relay delay time period between a network using an event trigger type communication protocol such as the CAN protocol and a network using a time trigger type communication protocol such as the FlexRay protocol, it is possible to realize a configuration including a network using an already used communication protocol and a network using a communication protocol which allows more advanced control, in the same movable body.

While the present invention has been described in detail, the foregoing description is in all aspects illustrative and not restrictive. It is understood that numerous other modifications and variations can be devised without departing from the scope of the present invention.

INDUSTRIAL APPLICABILITY

According to the present invention, it is possible to provide a data relay device which can prevent a significant delay from occurring even when relaying pieces of data which are transmitted/received using different communication protocols. The data relay device can be used, for example, in a data relay device which relays data in a network configured in a movable body such as a vehicle.

The invention claimed is:

1. A data relay device connected to a first communication line through which first data is transmitted/received in accordance with an event trigger type communication protocol and to a second communication line through which second data is transmitted/received in accordance with a time trigger type communication protocol, the data relay device comprising:
an estimation section which estimates, with reference to a timing at which the first data transmitted from at least one first communication node connected to the first communication line is received, first transmission timings of all the first data transmitted/received through the first communication line;
a schedule storage section which stores a predetermined schedule in accordance with which the second data is transmitted/received in accordance with the time trigger type communication protocol;
a determination section which determines a reference timing for the schedule, by calculating stay periods which occur when data is relayed to one of the first communication line and the second communication line, based on the first transmission timings estimated by the estimation section and on the schedule stored in the schedule storage section; and
a synchronization processing section which performs synchronization processing with at least one second communication node connected to the second communication line such that the second data is transmitted/received in accordance with the schedule with reference to the reference timing determined by the determination section.

2. The data relay device according to claim 1, wherein
each of the at least one first communication node transmits one or more types of the first data in respective one or more transmission cycles which are predetermined, the one or more types being different from each other,
the estimation section includes:
a first-time reception timing recognition section which recognizes, for the one or more types, a timing at which a piece of the first data of the type is received for the first time, as a first-time reception timing;
a cycle recognition section which recognizes, for the one or more types, when two consecutive pieces of the first data of the type are received, a time interval between the two pieces of the first data, as a transmission cycle; and
a transmission timing estimation section which associates, for the one or more types, the first-time reception timing with the transmission cycle and estimates, for the one or more types, with reference to the first-time reception timing of the type, all timings arriving in the corresponding transmission cycle associated with the first-time reception timing of the type, as the first transmission timings.

3. The data relay device according to claim 1, wherein
each of the at least one first communication node transmits one or more types of the first data in respective one or more transmission cycles which are predetermined to the respective one or more types, the one or more types being different from each other,
the data relay device further includes:
a cycle storage section which stores in advance the one or more transmission cycles in association with the one or more types, respectively, and
the estimation section includes:
a first-time reception timing recognition section which recognizes, for the one or more types, a timing at which a piece of the first data of the type is received for the first time, as a first-time reception timing; and
a transmission timing estimation section which associates, for the one or more types, the first-time reception timing with a corresponding transmission cycle and estimates, for the one or more types, with reference to the first-time reception timing of the type, all timings arriving in the corresponding transmission cycle associated with the first-time reception timing of the type, as the first transmission timings.

4. The data relay device according to claim 1, wherein
each of the at least one first communication node transmits one or more types of the first data which are different from each other, in respective one or more transmission cycles which are predetermined to the respective one or more types, with reference to a timing at which a type of the first data that is predetermined to be firstly transmitted is transmitted and after respective one or more transmission start intervals predetermined to the respective one or more types have elapsed,
the data relay device further includes:
a cycle storage section which stores in advance the one or more transmission cycles in association with the one or more types respectively; and
a transmission start interval storage section which stores the one or more transmission start intervals predetermined to the respective one or more types for each of the at least one first communication node,
the estimation section includes:
a transmission timing estimation section which estimates, with reference to a time when a piece of the first data is received for the first time from each of the at least one first node, all timings, for the one or more types, that will arrive in a corresponding transmission cycle predetermined to the type after a corresponding transmission start interval predetermined to the type elapses, as the first transmission timings.

5. The data relay device according to claim 1, wherein
the determination section includes:
a setting section which assumes and sets timings arriving at a predetermined time interval, as assumed timings;

a relay timing estimation section which estimates, for each of the assumed timings set by the setting section, when synchronization processing has been performed with the at least one second communication node such that the second data is transmitted/received in accordance with the schedule with reference to the corresponding assumed timing, relay timings at each of which the second data is received from the second communication line and relayed and transmitted as the first data to the first communication line;

a calculation section which calculates, for each of the assumed timings, overlapping periods which are caused by the first transmission timings estimated by the estimation section overlapping the relay timings estimated by the relay timing estimation section, the overlapping periods being generated when shifting the reference used for estimating the first transmission timings to one of the assumed timings set by the setting section, as the stay periods;

a sum calculation section which calculates a sum of the overlapping periods calculated by the calculation section for each of the assumed timings; and a reference timing determination section which determines an assumed timing, as the reference timing, that is associated with a smallest sum of the overlapping periods among a plurality of the sums of the overlapping periods, the plurality of the sums calculated by the sum calculation section.

6. The data relay device according to claim 1, wherein the determination section includes:

a setting section which assumes and sets timings arriving at a predetermined time interval, as assumed timings;

a relay timing estimation section which estimates, for each of the assumed timings set by the setting section, when synchronization processing has been performed with the at least one second communication node such that the second data is transmitted/received in accordance with the schedule with reference to the corresponding assumed timing, relay timings at each of which the second data is received from the second communication line and relayed and transmitted as the first data to the first communication line;

a calculation section which calculates, for each of the assumed timings, overlapping periods which are caused by the first transmission timings estimated by the estimation section overlapping the relay timings estimated by the relay timing estimation section, the overlapping periods being generated when shifting the reference used for estimating the first transmission timings to one of the assumed timings set by the setting section, as the stay periods;

a standard deviation calculation section which calculates a standard deviation of the overlapping periods calculated by the calculation section for each of the assumed timings; and a reference timing determination section which determines an assumed timing, as the reference timing, that is associated with a smallest standard deviation of the overlapping periods among a plurality of the standard deviations of the overlapping periods, the plurality of the standard deviations calculated by the standard deviation calculation section.

7. The data relay device according to claim 1, wherein the determination section includes:

a setting section which assumes and sets timings arriving at a predetermined time interval, as assumed timings;

a transmission timing estimation section which estimates, for each of the assumed timings set by the setting section, when synchronization processing has been performed with the at least one second communication node such that the second data is transmitted/received in accordance with the schedule with reference to the corresponding assumed timing, second transmission timings at each of which the second data is transmitted to the second communication line, based on the schedule;

a calculation section which calculates, for each of the assumed timings, delay periods as the stay periods, in which delay periods pieces of the first data which have been received at the first transmission timings estimated by the estimation section, the delay periods being generated when shifting the reference used for estimating the first transmission timings to one of the assumed timings set by the setting section, are relayed and transmitted to the second communication line as pieces of the second data at the second transmission timings estimated by the transmission timing estimation section;

a sum calculation section which calculates a sum of the delay periods calculated by the calculation section for each of the assumed timings; and a reference timing determination section which determines an assumed timing, as the reference timing, that is associated with a smallest sum of the delay periods among a plurality of the sums of the delay periods, the plurality of the sums calculated by the sum calculation section.

8. The data relay device according to claim 1, wherein the determination section includes:

a setting section which assumes and sets timings arriving at a predetermined time interval, as assumed timings;

a transmission timing estimation section which estimates, for each of the assumed timings set by the setting section, when synchronization processing has been performed with the at least one second communication node such that the second data is transmitted/received in accordance with the schedule with reference to the corresponding assumed timing, second transmission timings at each of which the second data is transmitted to the second communication line, based on the schedule;

a calculation section which calculates, for each of the assumed timings, delay periods as the stay periods, in which delay periods pieces of the first data which have been received at the first transmission timings estimated by the estimation section, the delay periods being generated when shifting the reference used for estimating the first transmission timings to one of the assumed timings set by the setting section, are relayed and transmitted to the second communication line as pieces of the second data at the second transmission timings estimated by the transmission timing estimation section;

a standard deviation calculation section which calculates a standard deviation of the delay periods calculated by the calculation section for each of the assumed timings; and a reference timing determination section which determines an assumed timing, as the reference timing, that is associated with a smallest standard deviation of the delay periods among a plurality of the standard deviations of the delay periods, the plurality of the standard deviations calculated by the standard deviation calculation section.

9. The data relay device according to claim 5, wherein
the setting section sets the assumed timings only within a predetermined time period from a time used as a reference by the estimation section when performing estimation.

10. A data relay method used in a data relay device connected to a first communication line through which first data is transmitted/received in accordance with an event trigger type communication protocol and to a second communication line through which second data is transmitted/received in accordance with a time trigger type communication protocol, the method comprising:

an estimation step of estimating, with reference to a timing at which the first data transmitted from at least one first communication node connected to the first communication line is received, first transmission timings of all the first data transmitted/received through the first communication line;

a determination step of determining, by calculating stay periods which occur when data is relayed to one of the first communication line and the second communication line, based on the first transmission timings estimated in the estimation step and based on a predetermined schedule in accordance with which the second data is transmitted/received in accordance with the time trigger type communication protocol, a reference timing for the schedule; and a synchronization processing step of performing synchronization processing with at least one second communication node connected to the second communication line such that the second data is transmitted/received in accordance with the schedule with reference to the reference timing determined by the determination step.

* * * * *